United States Patent
Lee

(10) Patent No.: US 12,184,987 B2
(45) Date of Patent: Dec. 31, 2024

(54) VIDEO CAMERA AND METHOD FOR CONTROLLING THE SAME

(71) Applicant: LG ELECTRONICS INC., Seoul (KR)

(72) Inventor: Changhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 18/069,027

(22) Filed: Dec. 20, 2022

(65) Prior Publication Data

US 2024/0064414 A1   Feb. 22, 2024

(30) Foreign Application Priority Data

Aug. 22, 2022 (WO) ................ PCT/KR2022/012498

(51) Int. Cl.
*H04N 23/74* (2023.01)
*G06V 10/141* (2022.01)
(Continued)

(52) U.S. Cl.
CPC ........... *H04N 23/74* (2023.01); *G06V 10/141* (2022.01); *H04N 23/11* (2023.01); *H04N 23/667* (2023.01)

(58) Field of Classification Search
CPC ...... H04N 23/74; H04N 23/11; H04N 23/667; H04N 23/45; H04N 23/56; H04N 23/71; H04N 23/90; G06V 10/141; G06V 10/147
See application file for complete search history.

(56) References Cited

U.S. PATENT DOCUMENTS

| | | | | |
|---|---|---|---|---|
| 2013/0100255 A1* | 4/2013 | Ohba | ................ | H04N 13/156 348/47 |
| 2016/0205301 A1* | 7/2016 | Park | ................ | H04N 23/66 348/370 |

(Continued)

FOREIGN PATENT DOCUMENTS

| | | |
|---|---|---|
| JP | 2009-010447 | 1/2009 |
| JP | 2015-139165 | 7/2015 |

(Continued)

OTHER PUBLICATIONS

PCT International Application No. PCT/KR2022/012498, Written Opinion and International Search Report dated May 16, 2023, 10 pages.

*Primary Examiner* — Lin Ye
*Assistant Examiner* — Tuan H Le
(74) *Attorney, Agent, or Firm* — LEE, HONG, DEGERMAN, KANG & WAIMEY

(57) ABSTRACT

The present disclosure relates to a camera having two or more cameras responsible for different illuminances. The present disclosure includes a first camera, a second camera, an illuminance sensor sensing an ambient light illuminance or a subject illuminance, an interface unit configured to connect to an external device, and a controller configured to photograph a first camera image through a first camera, photograph a second camera image through a second camera by performing a first camera operation switch when an illuminance sensed through the illuminance sensor is equal to or smaller than a first illuminance, photograph the first camera image through the first camera by performing a second camera operation switch when the illuminance sensed through the illuminance sensor is equal to or greater than a second illuminance higher than the first illuminance, and control one of the photographed first and second images (Continued)

to be transmitted to the external device through the interface unit.

19 Claims, 21 Drawing Sheets

(51) Int. Cl.
  *H04N 23/11* (2023.01)
  *H04N 23/667* (2023.01)

(56) References Cited

U.S. PATENT DOCUMENTS

| | | | |
|---|---|---|---|
| 2018/0309917 A1* | 10/2018 | Kim | H04N 23/90 |
| 2020/0272831 A1* | 8/2020 | Cho | G06T 7/97 |
| 2020/0389579 A1* | 12/2020 | Ise | H04N 9/77 |
| 2021/0092295 A1* | 3/2021 | Zhao | H04N 23/45 |
| 2022/0366584 A1* | 11/2022 | Choi | H04N 23/745 |

FOREIGN PATENT DOCUMENTS

| | | |
|---|---|---|
| JP | 2017-011632 | 1/2017 |
| KR | 10-2184295 | 11/2020 |

\* cited by examiner (a)

(b)

(a)

(b)

(a)

(b)

(a)

(b)

(a)

(b)

(a)

(b)

(19-1)

(19-2)

VIDEO CAMERA AND METHOD FOR CONTROLLING THE SAME

CROSS-REFERENCE TO RELATED APPLICATION

Pursuant to 35 U.S.C. § 119, this application claims the benefit of an earlier filing date and right of priority to International Application No. PCT/KR2022/012498, filed on Aug. 22, 2022, the contents of which are hereby incorporated by reference herein in its entirety.

BACKGROUND OF THE DISCLOSURE

Field of the Disclosure

The present disclosure relates to a video camera, and more particularly, to a camera capable of collecting various informations and having no restriction on an installation location. The present disclosure relates to a video camera with an improved freedom degree and an improved fixing force of a stand on which the video camera is mounted.

Discussion of the Related Art

In general, a web camera is attached to a top side of a monitor and may be connected to a computer by providing a USB port, an HDMI port, or the like. It is possible to photograph a user's face from the top side of the monitor, and has been used for video conferences or video calls.

A web camera is generally configured in a manner of being fixed to a top side of a monitor using a member such as a clip. Since a web camera is limitedly configured in a manner of being fastened to an upper part of a monitor, its installation place is limited.

As thickness of a monitor is diverse and a size of a bezel tends to decrease, there are many monitors to which a web camera stand fixed to a monitor top bezel in the form of a clip is not applicable, thereby causing a problem of poor versatility.

In addition, as the number of IOT devices at home has increased recently, home cameras have emerged as cameras to detect users and recognize gestures indoors in addition to the usage of taking pictures of users' faces when computers are used.

Existing home cameras were used to film indoors like CCTV for the purpose of observing pets or children and are installed on tables or ceilings.

In addition, since an environment is being created to conduct non-face-to-face tasks such as video conferencing and telemedicine instead of face-to0face tasks, the demand for video cameras for video conferencing or telemedicine is increasing.

In particular, regarding patients, since a patient who is lying down due to discomfort in movement has difficulty in being diagnosed while sitting in front of a computer monitor, it is difficult to use a web camera installed at a top side of a monitor only or a home camera installed in a manner of being fixed to a ceiling or the like.

There is a need for a video camera that can collect a variety of information and is unrestricted in its installation location.

SUMMARY OF THE DISCLOSURE

Accordingly, embodiments of the present disclosure are directed to a video camera that substantially obviates one or more problems due to limitations and disadvantages of the related art.

One object of the present disclosure is to provide a video camera including a stand that may be mounted in various places.

In particular, one object of the present disclosure is to provide a video camera that can be mounted on a floor, attached to a wall, and mounted on various types of display devices.

In addition, when the video camera is equipped with two or more cameras for different illuminances, an object of the present disclosure is to provide a method of controlling a video camera for a proper switch between the two or more cameras Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a video camera according to one embodiment of the present disclosure may include a body, a camera module installed in the body, and a stand located under the body to support, the stand including a leg bracket coupled to the body, a first leg rotatably coupled to the leg bracket through a first hinge, and a second leg rotatably coupled to an end portion of the first leg through a second hinge, wherein an angle and height of the body are adjustable by adjusting angles of the first and second hinges.

The leg bracket may be fastened to a backside of the body and a front leg located on a bottom front side of the body may be further included.

The front leg may be hinged to a bottom side of the body so as to contact the bottom side of the body or extending a vertical direction of the bottom side of the body.

The video camera may include a security hole located in the second leg so as to have a lock device coupled thereto.

The security hole may be formed in a protrusion portion protruding from the second leg, and the protrusion portion may be located in a backside direction of the body while the second leg and the first leg are folded to form an angle of 0° in between.

A pair of the first legs may be provided to left and right sides of the body, respectively and the second leg may be located between a pair of the first legs so as to be connected to a pair of the first legs on both sides thereof through the second hinges, respectively.

The video camera may further include a cable terminal located between a pair of the first legs of the body.

The second leg may form a same plane with the first leg while the second leg and the first leg are folded to form an angle of 0° in between.

The video camera may include a tripod nut provided to a bottom side of the second leg.

The video camera may further include a magnet provided to the second leg.

The first leg may include an upper leg connected to the first hinge and a lower leg extending from the upper leg by being bent with respect to the upper leg.

In another aspect of the present disclosure, as embodied and broadly described herein, provided is a video camera including a first camera, a second camera, an illuminance sensor sensing an ambient light illuminance or a subject illuminance, an interface unit configured to connect to an external device, and a controller configured to photograph a first camera image through a first camera, photograph a second camera image through a second camera by performing a first camera operation switch when an illuminance sensed through the illuminance sensor is equal to or smaller than a first illuminance, photograph the first camera image through the first camera by performing a second camera operation switch when the illuminance sensed through the illuminance sensor is equal to or greater than a second illuminance higher than the first illuminance, and control one of the photographed first and second images to be transmitted to the external device through the interface unit.

Based on performing the first camera operation switch, the controller may control the first camera to be turned off and control the second camera to be turned on. Based on performing the second camera operation switch, the controller may control the first camera to be turned on and control the second camera to be turned off.

Based on performing the first camera operation switch, the controller may control the first camera and the second camera to enter a sleep mode and an active mode, respectively. Based on performing the second camera operation switch, the controller may control the first camera and the second camera to enter the active mode and the sleep mode, respectively The first camera may include a visible light photographing camera and the second camera may include an infrared light photographing camera.

The controller may control an illuminance difference between the first illuminance and the second illuminance to be adjusted in consideration of the number of unit-time camera operation switches.

When the number of the unit-time camera operation switches exceeds a reference range, the controller may control at least one of the first illuminance and the second illuminance to be adjusted to increase the illuminance difference.

The controller may control the illuminance difference to be increased in a manner of increasing the second illuminance while decreasing the first illuminance to maintain a central illuminance of the illuminance difference.

When the number of the unit-time camera operation switches is within the reference range, the controller may control the illuminance difference to be maintained.

When the number of the unit-time camera operation switches is smaller than the reference range, the controller may control at least one of the first illuminance and the second illuminance to be adjusted to decrease the illuminance difference.

When the sensed illuminance is maintained equal to or smaller than the first illuminance during a transition time from a timing point of becoming equal to or smaller than the first illuminance, the controller may control the first camera operation switch to be performed. When the sensed illuminance is maintained equal to or greater than the second illuminance during the transition time from a timing point of becoming equal to or greater than the second illuminance, the controller may control the second camera operation switch to be performed.

The controller may control the transition time to be adjusted in consideration of the number of the unit-time camera operation switches.

When the number of the unit-time camera operation switches exceeds the reference range, the controller may control the transition time to be increased.

When the number of the unit-time camera operation switches is within the reference range, the controller may control the transition time to be maintained.

When the number of the unit-time camera operation switches is smaller than the reference range, the controller may control the transition time to be decreased.

The video camera may further include an infrared light source.

The controller may control the infrared light source to be turned on when performing photography through the second camera.

The controller may control a brightness of the infrared light source to be adjusted based on an infrared light illuminance sensed by the illuminance sensor.

The video camera may further include a user input unit configured to receive an input of a user command, and the controller may control one of the first camera operation switch and the second camera operation switch to be performed in response to the user command through the user input unit.

The video camera may further include a microphone configured to receive an input of audio, and the controller may control the audio to be transmitted together when one of the photographed first and second images is transmitted to the external device through the interface unit.

In further aspect of the present disclosure, as embodied and broadly described herein, provided is a method of controlling a video camera, the method including sensing an ambient light illuminance or a subject illuminance through an illuminance sensor, photographing a first camera image through a first camera, photographing a second camera image through a second camera by performing a first camera operation switch when an illuminance sensed through the illuminance sensor is equal to or smaller than a first illuminance, photographing the first camera image through the first camera by performing a second camera operation switch when the illuminance sensed through the illuminance sensor is equal to or greater than a second illuminance higher than the first illuminance, and transmitting one of the photographed first and second images to an external device through an interface unit.

Accordingly, the present disclosure provides the following effects and/or advantages.

A video camera of the present disclosure may be installed not only on a floor, but also on a monitor or wall, so that it may be easily installed in various places.

A video camera of the present disclosure may be provided with two hinges and installed on displays having various shapes and thicknesses.

In addition, a video camera of the present disclosure has a wide area of a mounting surface, thereby being mounted stably.

In addition, an efficient switching between two or more cameras is possible to be responsible for different illuminances.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present invention will become more fully understood from the detailed description given herein below and the accompanying drawings, which are given by illustration only, and thus are not limitative of the present invention.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
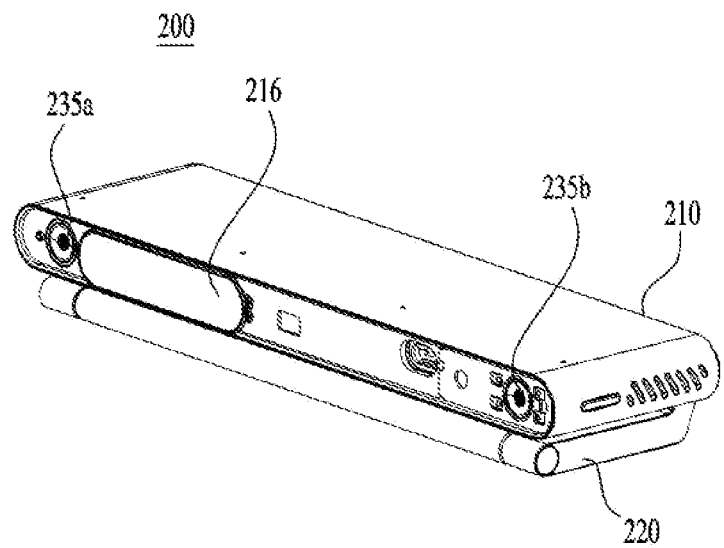
FIG. 1 and FIG. 2 are diagrams showing an installation example of a video camera according to the present disclosure.
Figure 1:
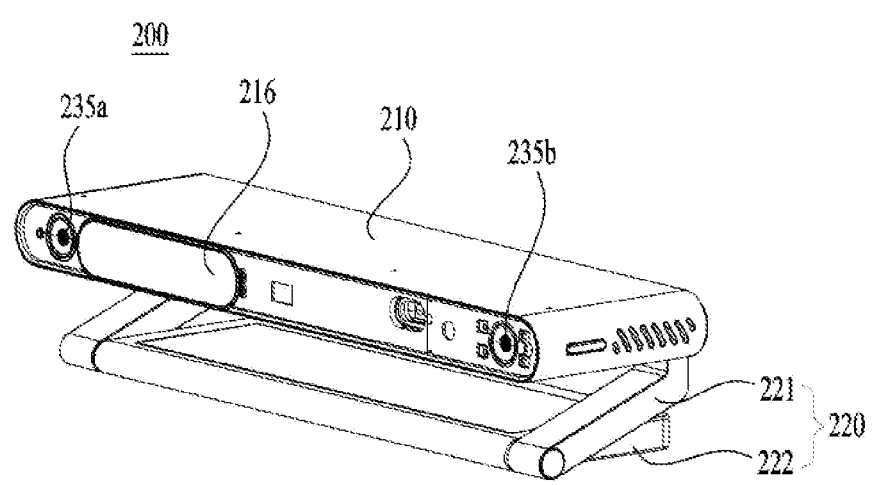

FIG. 1 is a diagram showing a video camera 200 according to the present disclosure. A video camera according to the present disclosure includes a body in a box shape and a stand supporting a bottom side of the body. The body has a camera located on a front side to perform telemedicine, video conference and the like by photographing and transmitting a user's face and the like to a remote place.

To collect more specific information using a plurality of cameras and obtain a sense of perspective such as a human eye using a plurality of cameras, the body may be provided with a long shape in a horizontal direction. The body is implemented thinly to provide an advantage in that the body does not stand out when disposed on a top side of a monitor or the like.

The stand is a device on which the body is mounted. For a conventional web camera, the stand is mainly formed as tongs or a clamp to be fixed to a top side of a monitor. For a home camera, the stand has an angle-adjustable configuration when mounted on a table or attached to a ceiling.

As shown in FIG. 1, the stand of the present disclosure includes a pair of legs and a pair of hinges, and may adjust the height and angle of the body by adjusting the angles of a pair of the hinges. The second leg serves to fix the stand to a mounting surface and the angle and height of the body may be adjusted through the first leg connecting the main body and the second leg.

As shown in FIG. 1 (a), while the first leg and the second leg are overlapped, the body is disposed in a manner of adhering to the mounting surface. As shown in FIG. 1 (b), the height and angle of the body may be controlled by adjusting the angle between the first leg and the body and the angle between the second leg and the first leg.

The stand including a pair of the legs and a pair of the hinges of the present disclosure minimizes the limitation of an installation location and freely adjusts the height and angle after installation, thereby improving the availability of the video camera.

Figure 2:
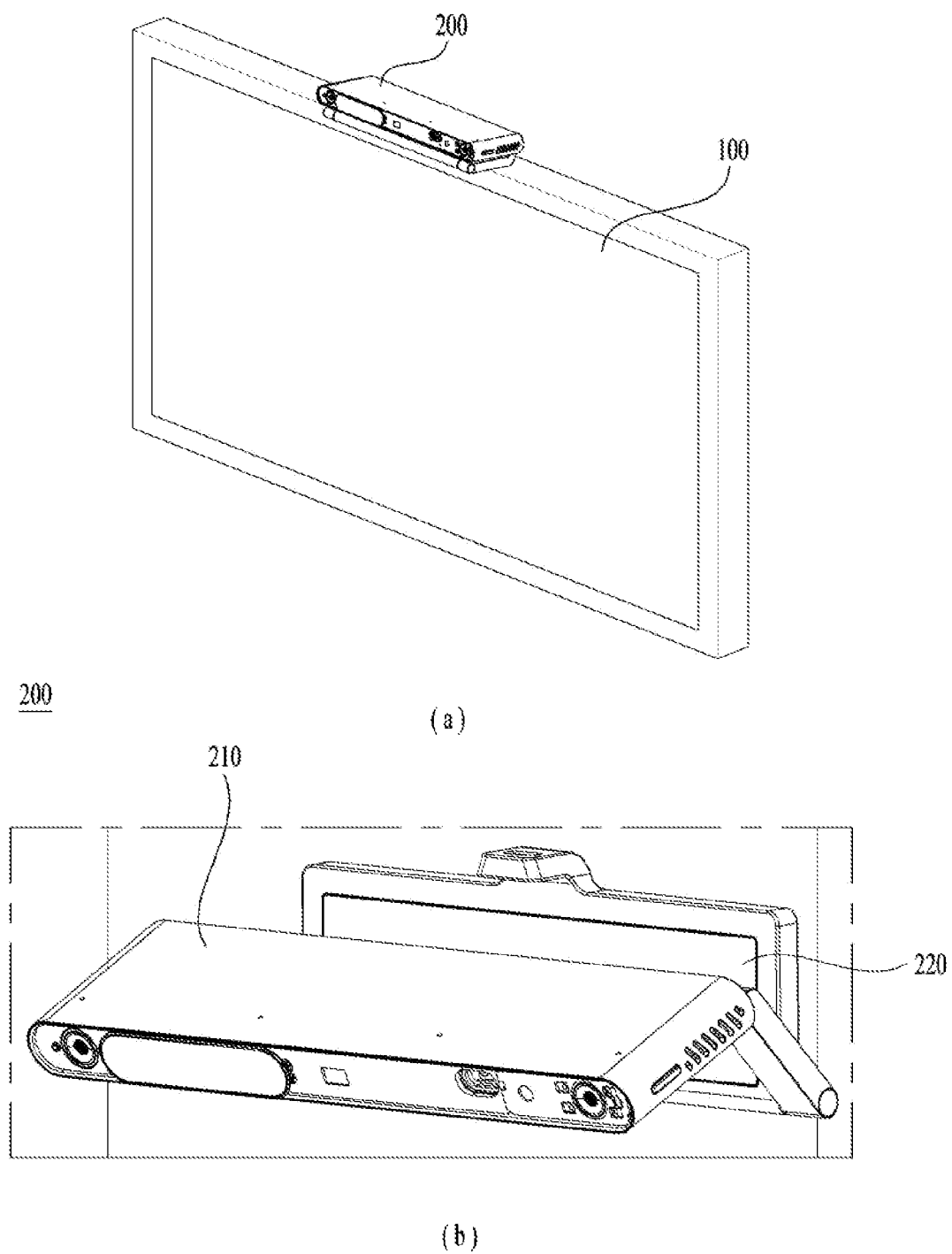

FIG. 2 is a diagram showing an installation example of a video camera 200 of the present disclosure. The video camera 200 of the present invention includes a housing 211a and 211b of a body 210 in which electronic components such as cameras 235a and 235b and the like are installed and a stand 220 configured to fixing the video camera 200 to a mounting surface.

In addition to the method of mounting on the floor as shown in FIG. 1, the stand of the present disclosure invention may be fixed to a top side of a display device 100 or a wall surface as shown in FIG. 2.

As shown in FIG. 2 (*a*), the stand may be fixed to a top side of a display unit. The stand may be stably fixed to a top side of a display device 100, of which bezel becomes narrower and thinner recently. In addition, as shown in FIG. 2 (*b*), the stand may also be fixed to a wall surface.

Figure 3:
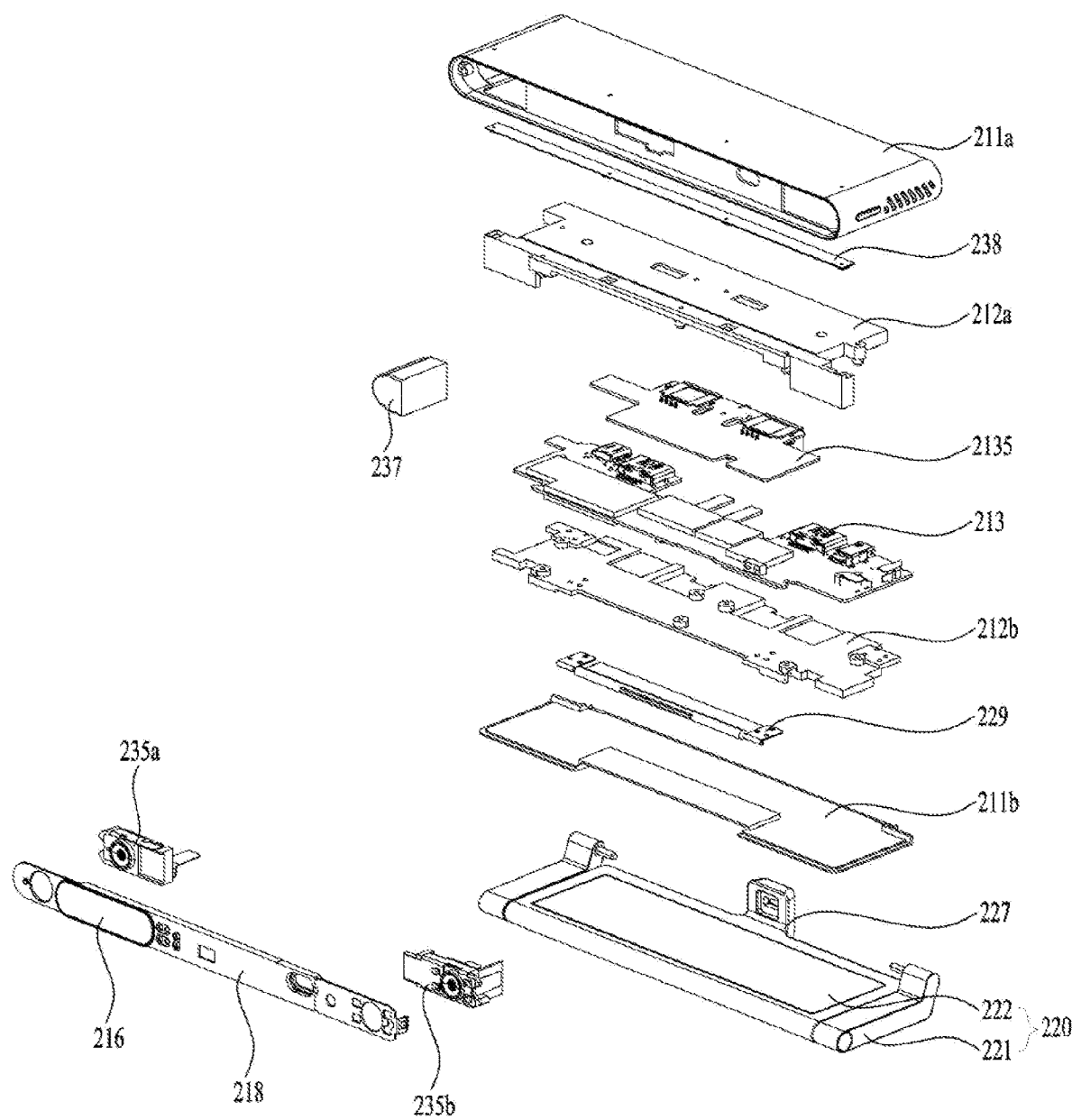
FIG. 3 is an exploded perspective diagram of a video camera according to the present disclosure.

FIG. 3 is an exploded perspective diagram of a video camera 200 according to the present disclosure. The video camera 200 of the present disclosure includes a housing 211*a* and 211*b* of a body 210 in which cameras 235*a* and 235*b* and a board unit 213 are located, and is provided with a stand 220 coupled to the housing 211*a* and 211*b* of the body 210.

As the housing 211*a* and 211*b* of the body 210 is implemented in a rectangular box shape, it is advantageous in minimizing a volume and facilitating portability. In addition, as shown in FIG. 2 (*a*), when the housing 211*a* and 211*b* of the body 210 mounted on a top side of the display device 100, since the housing 211*a* and 211*b* of the body 210 has a shape long in a horizontal direction, it is not projected from the top side of the display device 100. Namely, although the housing 211*a* and 211*b* of the body 210 is installed on the top side of the display device 100, it is able to minimize the influence on an exterior of the display device 100.

As the housing 211*a* and 211*b* of the body 210 is disposed long in a horizontal direction, a front side has a wide area, various types of cameras such as a wide angle camera 235*a*, an IR camera 235*b* and the like may be installed. When more various types of the cameras 235*a* and 235*b* are provided, a sensing range becomes wider.

For example, the wide angle camera 235*a* may capture a wide area without a blind spot, and the IR camera 235*b* may recognize an object even at dark night. In addition, since it is possible to detect the distance, it is possible to obtain distance information necessary for controlling IOT devices.

In addition to the cameras 235*a* and 235*b*, electronic components such as an illuminance sensor, a temperature sensor, a proximity sensor, a microphone 218, a speaker 217 and the like may be mounted together to expand functions.

Since the housing 211*a* and 211*b* of the body 210 forms an external appearance, the housing 211*a* and 211*b* may be formed by injection molding and my further include a metal frame 212 for mounting electronic components such as the board unit 213, the cameras 235*a* and 235*b* and the like with internal rigidity. A window covering the cameras 235*a* and 235*b* and sensors located on the front side may be included. A camera cover 216 capable of physically covering a camera may be included to protect personal privacy. The camera cover 216 may slide to move and selectively open and close the camera 235*a*. The camera cover 216 of the present disclosure is disposed only on a side of the wide-angle camera 235*a*, but may also be installed on a side of the IR camera 235*b*. A stand 220 is fastened to the body 210 and, more specifically, may be coupled to a rigid frame 212 to support a force. The stand 220 of the present disclosure may be folded to be in a manner of getting close contact with a bottom side of the body housing 211*b* as shown in FIG. 1 (*a*), and an angle thereof may be changed as shown in FIG. 1 (*b*) to adjust a position with respect to a bottom surface of the body 210.

As shown in FIG. 1 (*a*), the stand 220 of the video camera 200 according to the present disclosure may be folded so that the stand 220 is in close contact with the body housing 211*b*, thereby being portable and facilitating height adjustment advantageously.

Figure 4:
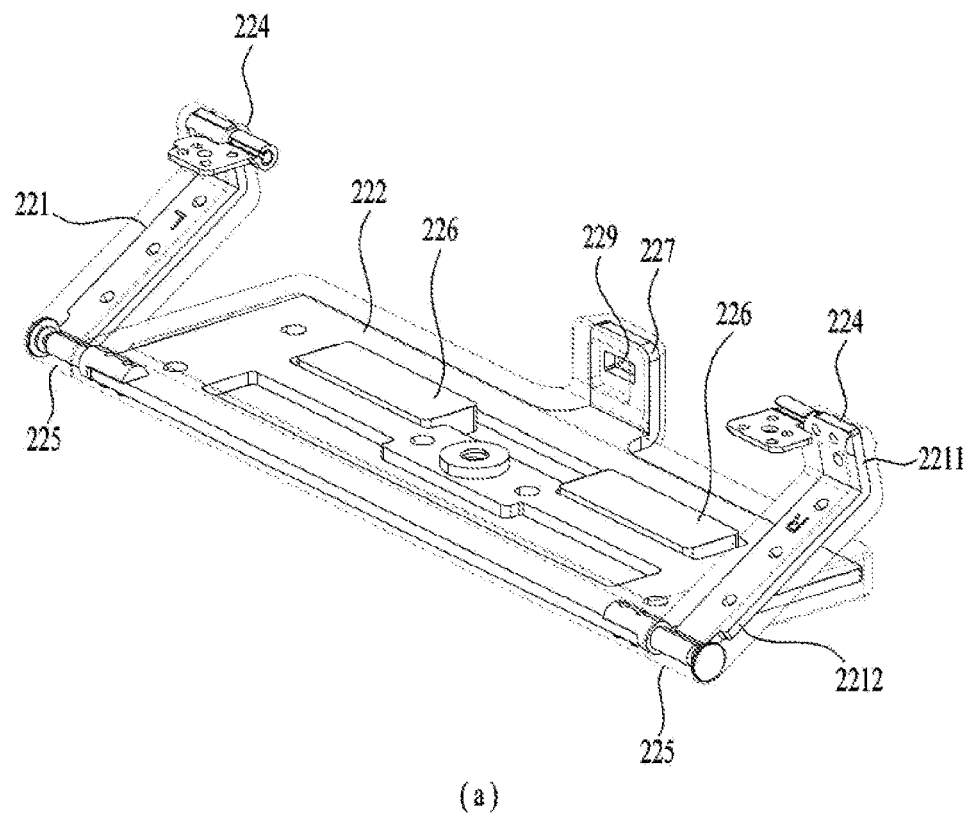
FIG. 4 is a perspective diagram showing a stand of a video camera according to the present disclosure.
Figure 4:
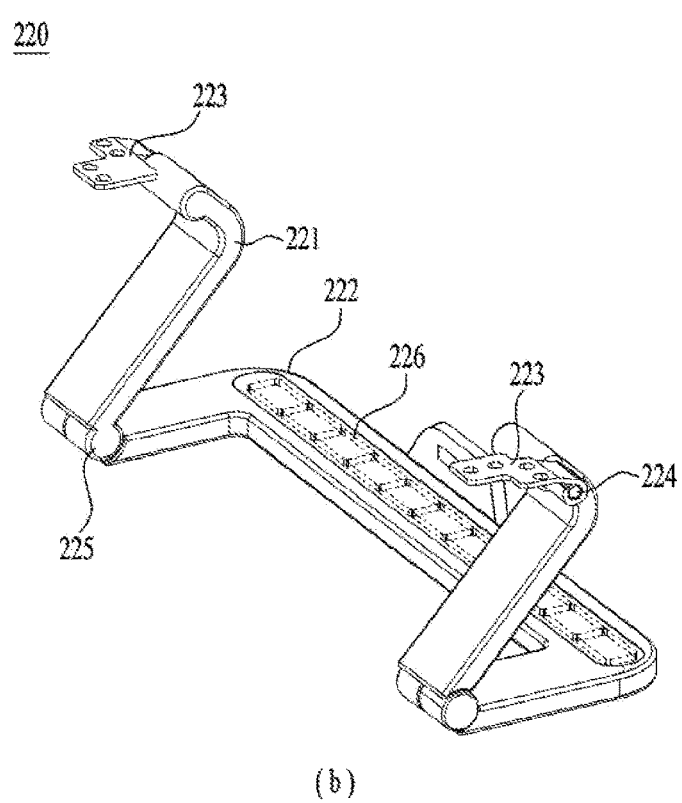

FIG. 4 is a perspective diagram showing a stand 220 of a video camera 200 according to the present disclosure.

The stand 220 of the present disclosure may include a leg bracket 223 coupled to the body 210, a first leg 221 rotatably coupled to the leg bracket via a first hinge 224, and a second leg 222 rotatably coupled to the first leg 221 via a second hinge 225.

The stand 220 may include a single leg bracket 223, a first leg 221, a second leg 222, a first hinge 224 and a second hinge 225. Alternatively, as shown in FIG. 4, the stand 220 may include a pair of leg brackets 223, a pair of first legs 221, a pair of first hinges 224 and a pair of second hinges 225*m*, and a second leg 222 is connected in-between to be integrally configured.

If only one leg is provided, it may be inclined to one side, hence degrading stability. If the leg is configured in a wide shape in a side direction for stability, an area of a leg may be widened unnecessarily.

When the stands 220 are provided at both sides thereof, respectively, each leg should be adjusted. When the shapes of the stands 220 at both sides thereof are different from each other, the body 210 may be inclined in a lateral direction. Thus, a pair of the first legs 221 may be coupled to both sides of the body 210, thereby providing stability.

The second leg 222 is located between the first legs 221, and may be connected to a pair of the first legs 221 via the second hinges 225. The second leg 222 may be configured in a plate shape having a large area to provide a sense of stability as a portion in contact with the mounting surface. Alternatively, as shown in FIG. 4 (*b*), the second leg 220 may have a U-shape of which front side is omitted.

The second leg 222 forms the mounting surface, and the first leg 221 plays a role in adjusting a height angle between the second leg 222 and the body 210.

The first leg 221 and the second leg 222 may be configured to have the same thickness, and when the second hinge 555 between the first leg 221 and the second leg 222 is folded to become 0°, the first leg 221 and the second leg 222 may overlap or form the same plane.

As shown in FIG. 3, when the second leg is disposed between the first legs, the thickness of the stand may be minimized when the stand is folded.

As shown in FIG. 1 (*a*), the first leg 221 and the second leg 222 may be disposed in parallel with a bottom surface of the housing 211*a* and 211*b* of the body 210 in a state in which both of the first hinge and the second hinge are folded to form 0°.

The second leg 222 of the present disclosure may include a magnet 226, as shown in FIG. 4. Recently, as the thickness of the display device 100 decreases, a case may uses a galvanized steel plate for rigidity or an inner member made of a metal material may be provided in the case, and thus the second leg 222 may be attached to the display device 100 through a magnetic force of the magnet 226.

The stand 220 of the video camera 200 of the present disclosure may adjust an angle between the body 210 and the first leg 221 and an angle between the first leg 221 and the second leg 222 through the first hinge 224 and the second hinge 225, thereby changing the shape of the stand 220 in various forms.

The first leg 221 may have a bent shape. That is, an upper leg to which the first hinge 224 is coupled and a lower leg to which the second hinge 225 is coupled may have a bent shape. Since the first hinge 224 coupled to the leg bracket 223 is located in a backside direction of the body 210 in order to increase the fastening force by horizontally coupling the leg bracket 223 to the frame 212, a first end portion of the first leg 221 is located over a bottom side of the body 210.

Figure 5:
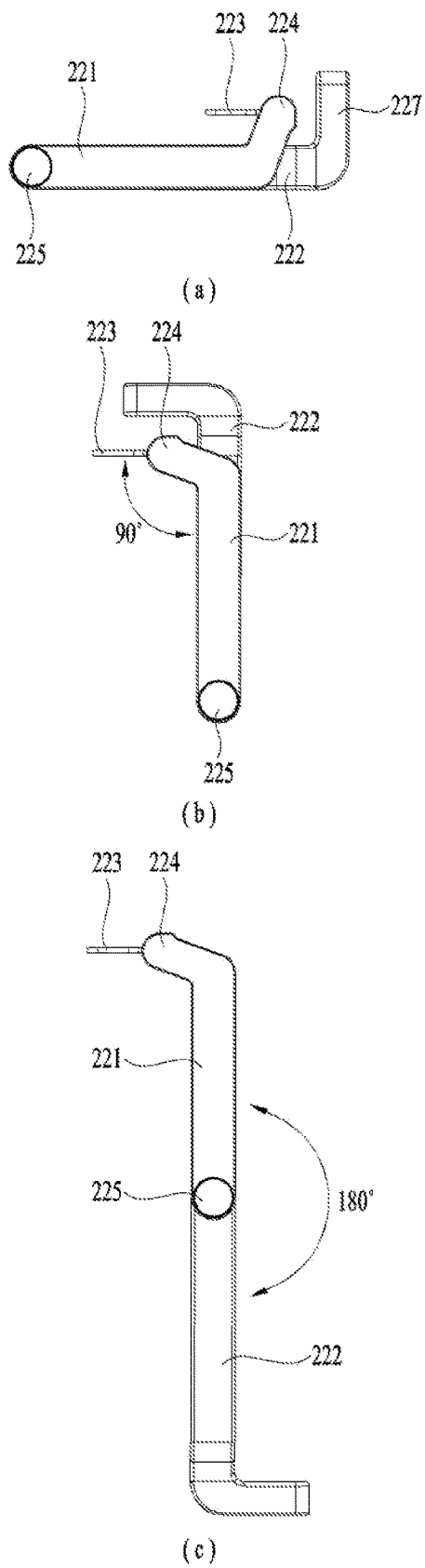
FIG. 5 is a diagram showing a hinge rotation range of a stand of a video camera according to the present disclosure.

As shown in FIG. 1 (a), the first leg 221 may be configured to implement a length, which corresponds to a height difference between the first end portion to which the leg bracket 223 is coupled and the bottom surface of the housing 211a and 211b of the body 210, with the upper leg 2211 and have the upper leg 2211 bent with the lower leg 2212. The upper leg 2211 and the lower leg 2212 may be bent with each other while forming a curve. FIG. 5 is a diagram showing a range of a rotatable angle between the first hinge 224 and the second hinge 225. The first hinge 224 and the second hinge 225 may be disposed in parallel with each other, the first hinge 224 may rotate within a range of 90° as shown in FIG. 5 (a) and FIG. 5 (b), and the second hinge 225 may rotate within an angle range of 180° as shown in FIG. 5 (b) and FIG. 5 (c).

Since each of the first hinge 224 and the second hinge 225 has friction, an angle thereof is changed when a force of a predetermined size or more is applied. Since the weight of the body 210 is only a few hundred grams, the angle is not changed by the weight of the body 210.

Figure 6:
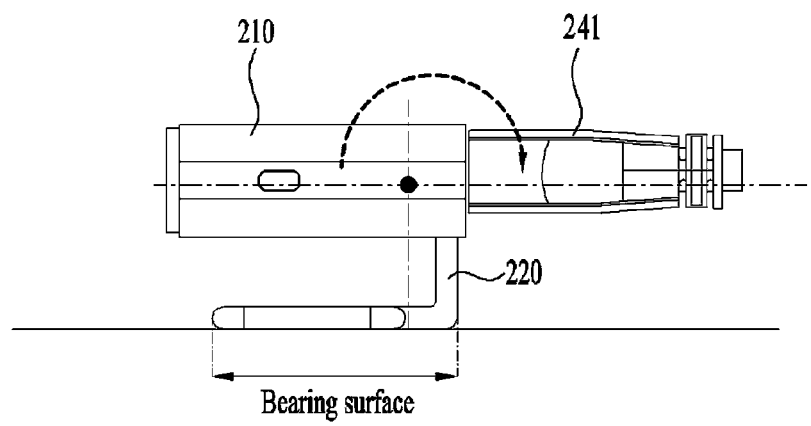
FIG. 6 is a diagram showing an example of a stand of a video camera of a related art.
Figure 6:
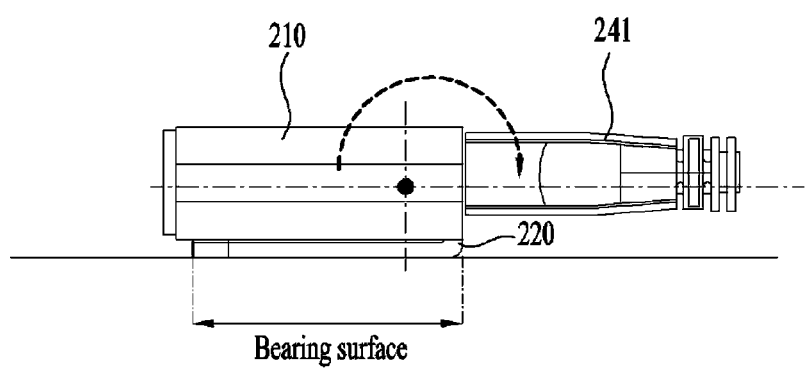

FIG. 6 is a diagram showing an example of a stand 220 of a video camera 200 of a related art. Since a plug 241 of a USB, a HDMI cable or a power cable is connected to a backside of the video camera 200, the center of gravity of the video camera 200 may be located slightly in a backside direction from the center of a body 210.

When the center of gravity of a bearing part is located at the center of a bearing surface of the stand 220, stable mounting is possible. However, when the stand 220 has a length corresponding to a front-rear direction length of the body 210, as shown in FIG. 6 (a), the center of gravity is biased in a backside direction, and thus a front side of the video camera 200 is easily inclined upward. As shown in FIG. 6 (b), when the body 210 is in close contact with the stand 220, stable mounting is possible, but it is difficult to adjust the height and angle of the body 210.

Figure 7:
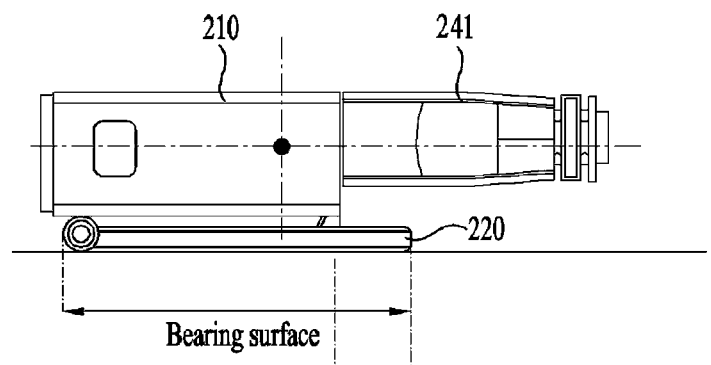
FIG. 7 is a diagram showing a form of mounting a video camera of the present disclosure on a floor.
Figure 7:
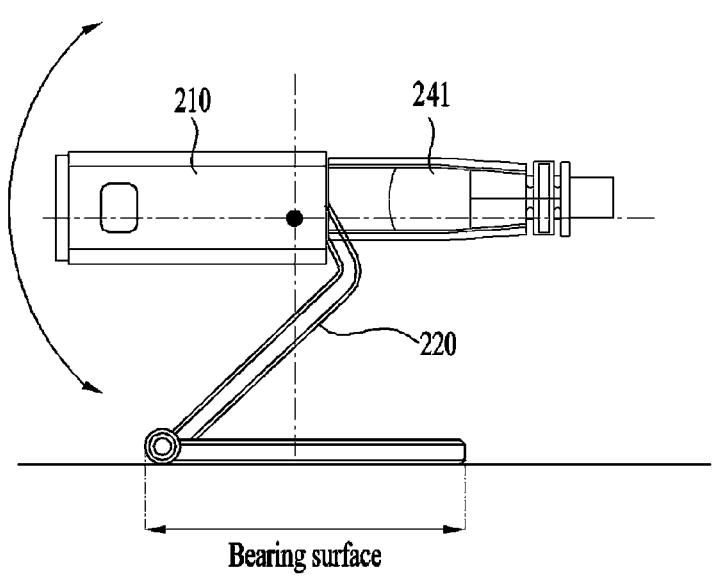

FIG. 7 is a diagram showing a form of mounting a video camera 200 of the present disclosure on a floor. A stand 220 of the video camera 200 of the present disclosure is configured to extend partially in a backside direction of the body 210 so as to reinforce the bearing force in a backside direction of the center of gravity.

As shown in FIG. 7 (a), the body 210 can be stably mounted while being in close contact with a floor surface. As shown in FIG. 7 (b), the height of the body 210 may be increased by adjusting angles of the first hinge 224 and the second hinge 225. In this case, since a position of the body 210 with respect to the second leg 222 (a bearing surface) moves in a front direction, even when the body 210 is spaced apart from the bearing surface, the center of gravity moves in a central direction of the bearing surface, whereby the body 210 may be stably mounted.

Since the angle of the body 210 can be freely adjusted by adjusting the angle of the first hinge 224, the cameras 235a and 235b may be disposed in a desired direction even when the mounting surface is positioned on a floor side or above.

Figure 8:
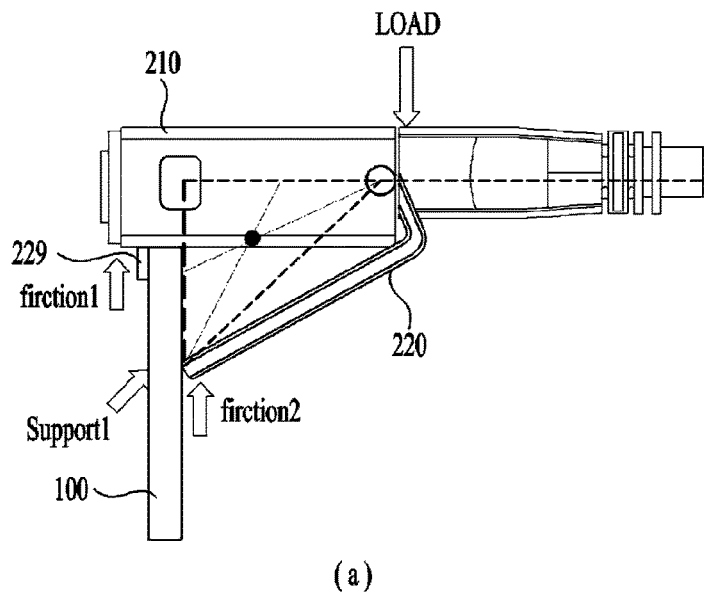
FIG. 8 is a diagram showing a state in which a video camera of the present disclosure is mounted on a display device depending on a presence or absence of a second leg.
Figure 8:
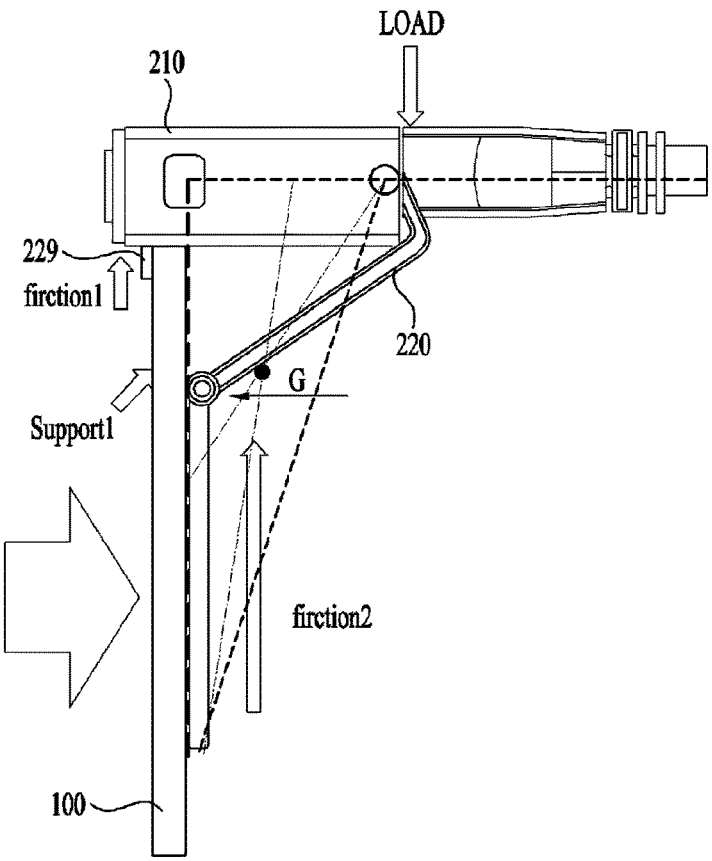

FIG. 8 is a diagram showing a state in which the video camera 200 of the present disclosure is mounted on the display device 100 depending on a presence or absence of the second leg 222.

FIG. 8 (a) shows s a video camera having no second leg 222 according to a related art, and FIG. 8 (b) shows an embodiment of the video camera 200 having the second leg 222 according to the present disclosure.

Although a clip shape is conventionally used to be applied to the display device 100 according to various thicknesses and backside shapes, a top bezel of a predetermined size or more is required in the display device in order to stably fix a clip-shaped stand.

Recently, as there are products in which the bezel size of the display device 100 is small and less than 1 cm, a stand applicable to a thick display device 100 as well as to a product with a small bezel is required.

A front leg 229 positioned on a front bottom side of the body 210 may be included so as to contact a front top side of the display device 100. The video camera 200 located above the display device 100 may weigh in a backside direction, and the front leg 229 may be in close contact with the front top side of the display by the weight of the video camera 200.

The front leg 229 may be disposed at a position that does not overlap the stand 220 in a folded state so that the stand 220 may be in close contact with the body 210 while it is in the folded state.

As shown in FIG. 8 (a), the first leg 221 may contact a backside of the display device 100 to support the weight of the body 210. However, in the shape of the stand 220 without the second leg 222, since only an end portion of the first leg 221 of the stand 220 contacts the display device 100, an area in which the stand 220 contacts the display device 100 is small, and thus a bearing force is weak.

Accordingly, according to an embodiment of the present disclosure including the second leg 222 as shown in FIG. 8 (b), a contact area between the stand 220 and the display device 100 increases, thereby increasing a frictional force and a reaction force by the second leg 222.

Since the display device 100 includes a metal material in a backside case or at least an inside thereof, the stand 220 may be fixed to the display apparatus 100 through a magnetic force of the magnet 226 positioned in the second leg 222.

Figure 9:
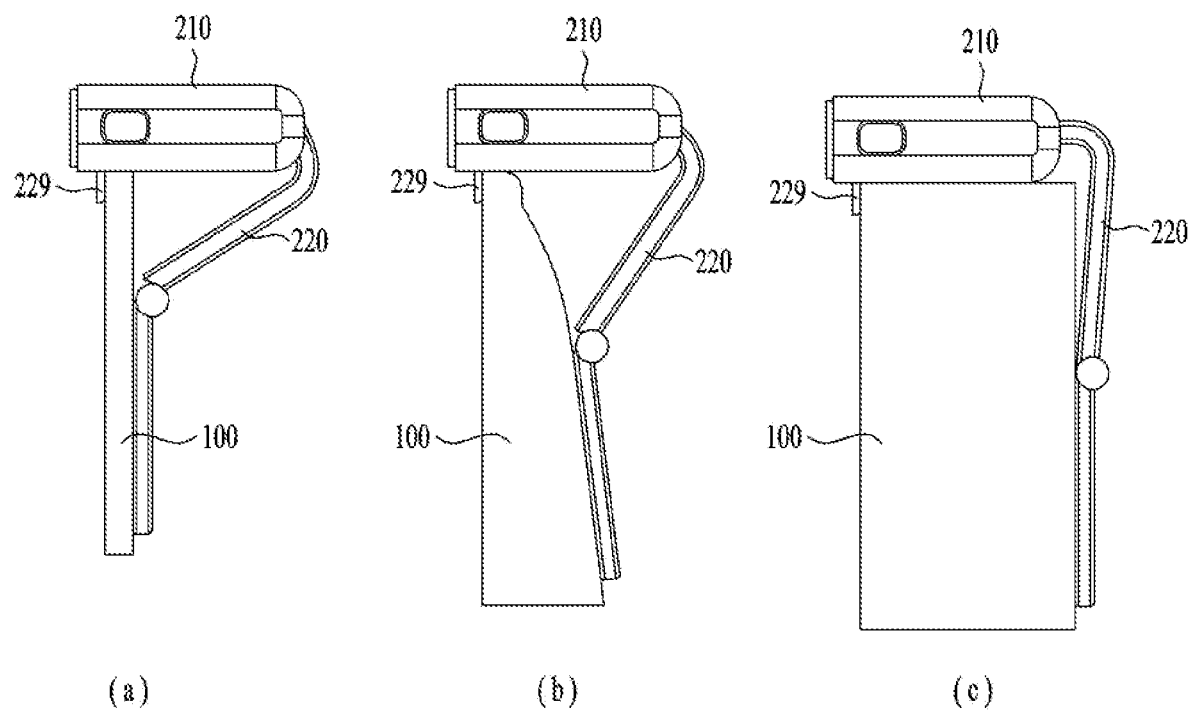
FIG. 9 is a diagram showing aspects in which a video camera of the present disclosure is mounted on each of display devices in various shapes.

FIG. 9 is a diagram showing aspects in which the video camera 200 of the present disclosure is mounted on each of the display devices 100 in various shapes. FIG. 9 (a) is a diagram showing that the video camera 200 of the present invention is mounted on a thin display device 100, FIG. 9 (b) is a diagram showing that the video camera 200 of the present invention is mounted on a display device 100 having an inclined surface on a backside thereof, and FIG. 9 (c) is a diagram showing that the video camera 200 of the present invention is mounted on a thick display device 100.

The angles of the first leg 221 and the second leg 222 may be adjusted by using the first hinge 224 and the second hinge 225 to correspond to the thickness and backside shape of the display device 100 to have the video camera 200 mounted thereon.

The second leg 222 comes in close contact with the backside of the display device 100, and the angles of the first hinge 224 and the second hinge 225 may be changed so that the first leg 221 can connect the body 210 and the second leg 222 irrespective of the thickness and backside shape of the display device 100.

As shown in FIG. 8, the second leg 222 may be fixed to the backside of the display device 100 through the friction force of the second leg 222 and the magnetic force of the magnet 226 installed in the second leg 222, and the first leg 221 may support the body 210 to enable the video camera 200 to be fixed to the top side of the display device 100 as shown in FIG. 9.

Figure 10:
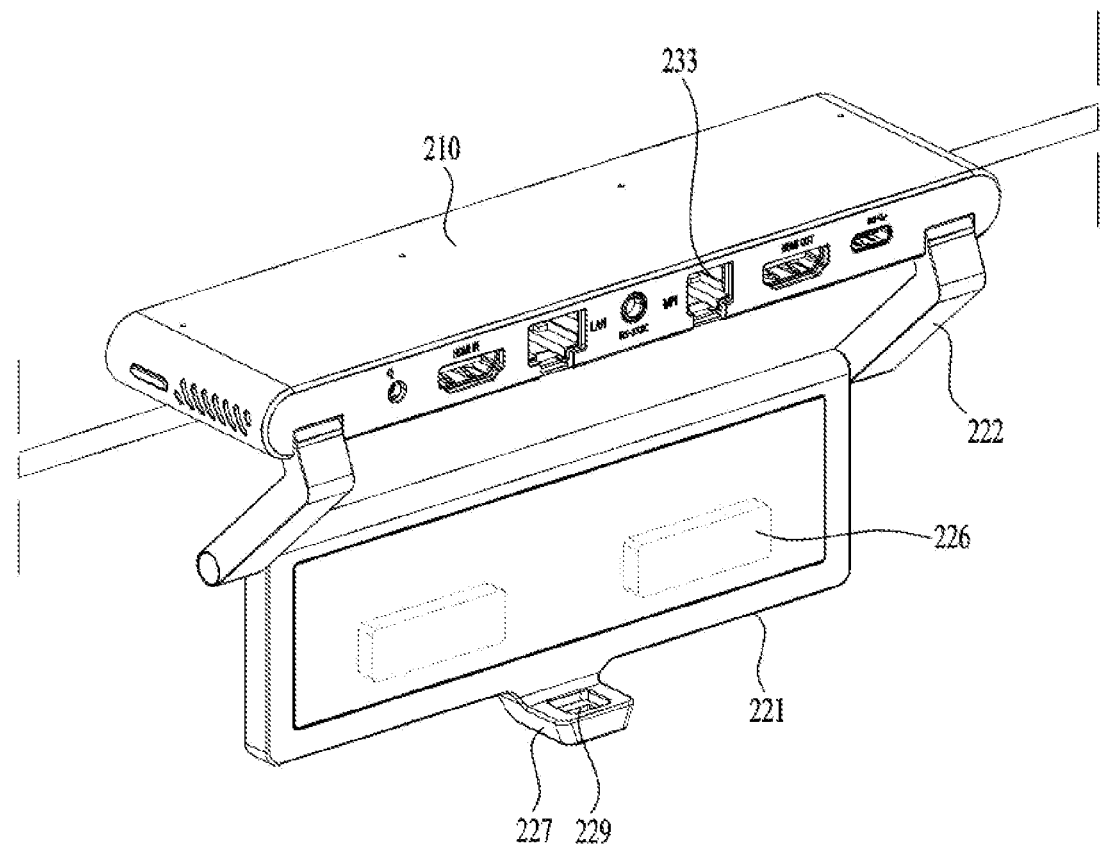
FIG. 10 is a rear view diagram showing a state in which a video camera of the present disclosure is mounted on a display device.

FIG. 10 is a rear view diagram showing a state in which the video camera 200 of the present disclosure is mounted on the display device 100. A power terminal or a cable terminal connected to an external device may be disposed on the backside of the body, and the cable terminal may be positioned between a pair of the first legs 221.

A security hole 229 located in the stand 220 of the video camera 200 may be further included.

The security hole 229 is a device in which a locking device such as a Kensington locker can be inserted. The video camera 200 may be installed in a public place, and in this case, there is a risk of theft.

The theft of the video camera 200 may be prevented through the security hole 229 into which a lock device inserted into the hole and then expanded to be fixed therein, such as a Kensington locker, can be inserted.

The position of the security hole 229 is not limited, but when the security hole 229 is formed in a rear side of the body 210, the center of gravity of the body 210 may be further biased in a backside direction, and when the security hole 229 is formed in the first leg 221 on one side, the left and right balance of the center of gravity may collapse.

When the security hole 229 is formed in the second leg 222, as the second leg 222 is configured to be in close contact with the bearing surface, and thus it is difficult to fasten the lock device in a mounted state.

Therefore, as shown in FIG. 10, the security hole 229 may be formed in a protrusion 227 protruding from an end portion of the second leg 222, and the second leg 222 may extend more in a backside direction than the body 210 so that the protrusion 227 fails to overlap the first leg 221 in a folded state of the stand 220.

As described above, the video camera 200 of the present disclosure can be installed not only on a floor, but also on a monitor or a wall, so that it can be easily installed in various places.

As the stand 220 of the video camera 200 according to the present disclosure includes two hinges 224 and 225, it may be installed on any one of displays having various shapes and thicknesses.

In addition, since an area of a mounting surface is wide, stable mounting is possible.

Figure 11:
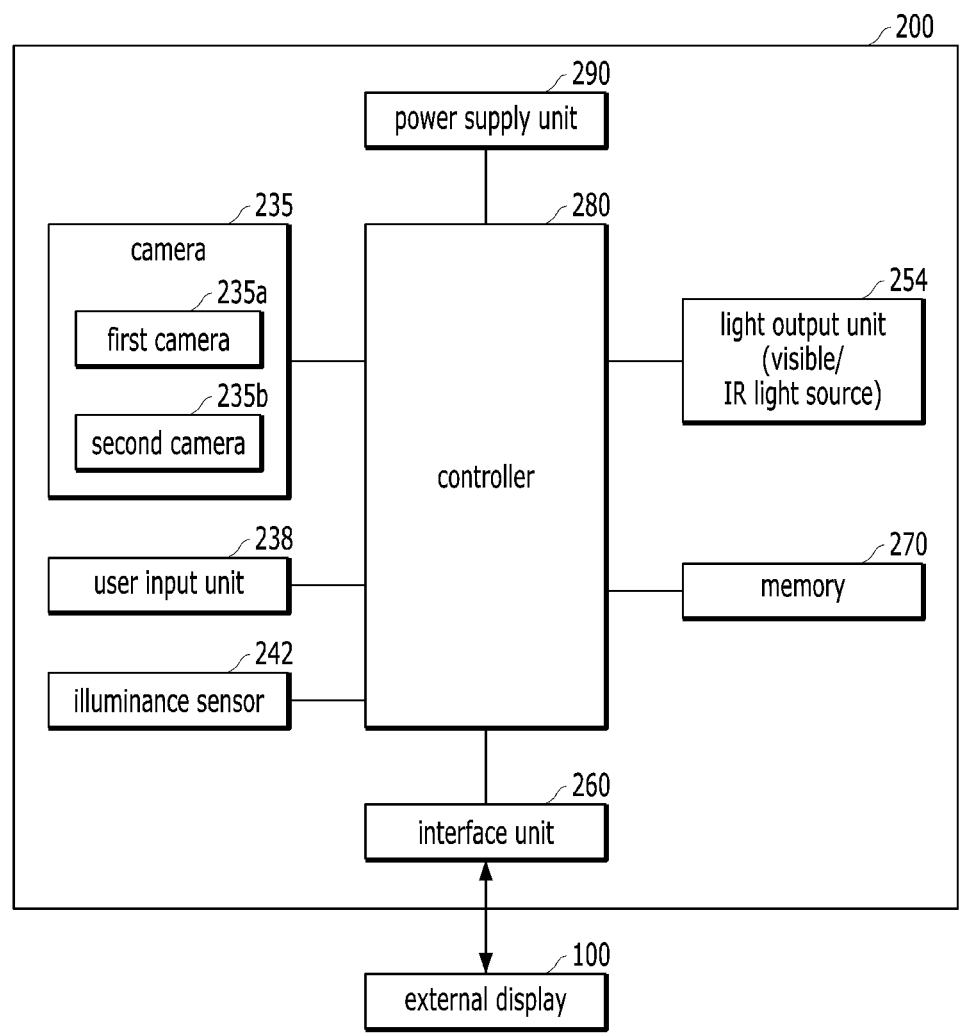
FIG. 11 is a block diagram to describe a home camera video camera related to the present disclosure.

Hereinafter, the video camera 200 according to the present disclosure will be described with reference to FIG. 11 in terms of a function or an operation. FIG. 11 is a block diagram to describe a home camera video camera related to the present disclosure.

The video camera 200 may include a camera 235, a user input unit 238, an illuminance sensor 242, a light output unit 254, an interface unit 260, a memory 270, a controller 280, a power supply unit 290, and the like. It is understood that implementing all of the illustrated components in FIG. 11 is not a requirement, and that greater or fewer components may alternatively be implemented.

The camera 235 may include one or a plurality of cameras 235*a* and 235*b*. The camera 235 may process image frames of a still image, a moving image and the like obtained by an image sensor. The processed image frame may be transmitted to an external display 100 connected through the interface unit 260 or may be stored in the memory 270.

The camera 235 includes at least one of a camera sensor (e.g., CCD, CMOS, etc.), a photo sensor (or an image sensor), and a laser sensor.

Implementing the camera 235 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 235 may include a first camera 235*a* and a second camera 235*b*. The first camera 235*a* may include an RGB camera for visible light photographing, and the second camera 235*b* may include an infrared (IR) camera for infrared light photographing. The first camera 235*a* and the second camera 235*b* may capture images by alternately operating with each other alternately or simultaneously.

The user input unit 238 is configured to receive information or commands from a user, and may include a touch key, a mechanical key, etc.

The illuminance sensor 242 may sense brightness of ambient light of the video camera 200 and/or brightness of a subject. The illuminance sensor 242 may be configured to sense only the brightness of visible light, or may be configured to sense both visible light and infrared light.

The light output unit 254 is a light source for irradiating light to a subject to increase illuminance when the camera 235 captures a still image or a moving image of the subject, and may include a visible light source for irradiating visible light and/or an infrared light source for irradiating infrared light. The light source may include, for example, a Light Emitting Diode (LED), but is not limited thereto. According to an embodiment of the present disclosure, the light output unit 254 may be equipped with both the visible light source and the infrared light source, or only the infrared light source.

The interface unit 260 becomes a passage through which the video camera 200 may be connected to an external device such as the external display 100. For example, the interface unit 260 may include at least one of a connection terminal for connection with an external device (e.g., an HDMI port), a port for short-range communication (e.g., an infrared port (IrDA port), a Bluetooth port, a wireless LAN port, etc.), or a power supply terminal for supplying power to the video camera 200.

The memory 270 stores data supporting various functions of the video camera 200. The memory 270 may store multiple application programs or applications running in the video camera 200, data for the operation of the video camera 200, and commands. At least some of these application programs may be downloaded from an external server through wireless communication. In addition, at least some of these application programs may be stored in the memory 270 from the time of shipment for the basic functions of the video camera 200. Meanwhile, the application program may be stored in the memory 270 and installed on the video camera 200, and driven by the controller 280 to perform the operation (or function) of the video camera 200.

The memory 270 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like.

In addition to the operation related to the application program, the controller 280 generally controls the overall operations of the video camera 200. The controller 280 may process signals, data, information, or the like input or output through the components described above, or may drive an application program stored in the memory 270.

A method of controlling the above-configured video camera 200 will be described as follows.

When the home camera 200 is shooting visible light with the camera 235, the operation of the visible light source 254 for irradiating the subject with visible light may be controlled according to the brightness of the ambient light (visible light) sensed by the illuminance sensor 242. That is, when the ambient light is bright, the home camera 200 may turn off the visible light source 254 to photograph the subject with visible light. When the ambient light is dark, the home camera 200 may turn on the visible light source 254 to irradiate the subject with visible light, thereby photographing the subject with the visible light.

However, even though it was intentional that the ambient light became dark as necessary, if the video camera 200 turns on the visible light source 254, this may be contrary to the original intention. For example, it is assumed that a subject photographed by the video camera 200 is a patient hospitalized. If the visible light source 254 is turned on to photograph the patient even though a medical staff intentionally dims the ambient light for the patient's rest and stability, this may interfere with the patient's rest and stability.

Figure 12:
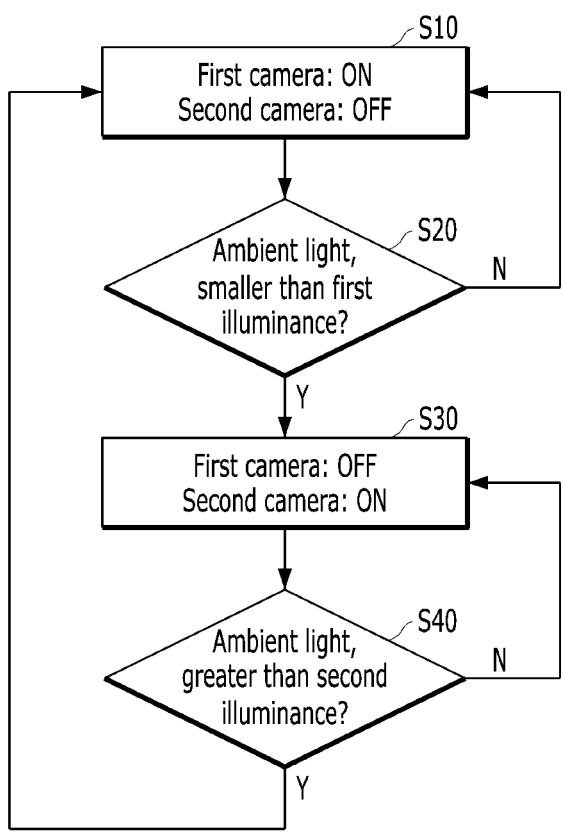
FIG. 12 is a flowchart of an operation switch between a first camera and a second camera of a video camera according to one embodiment of the present disclosure.
Figure 13:
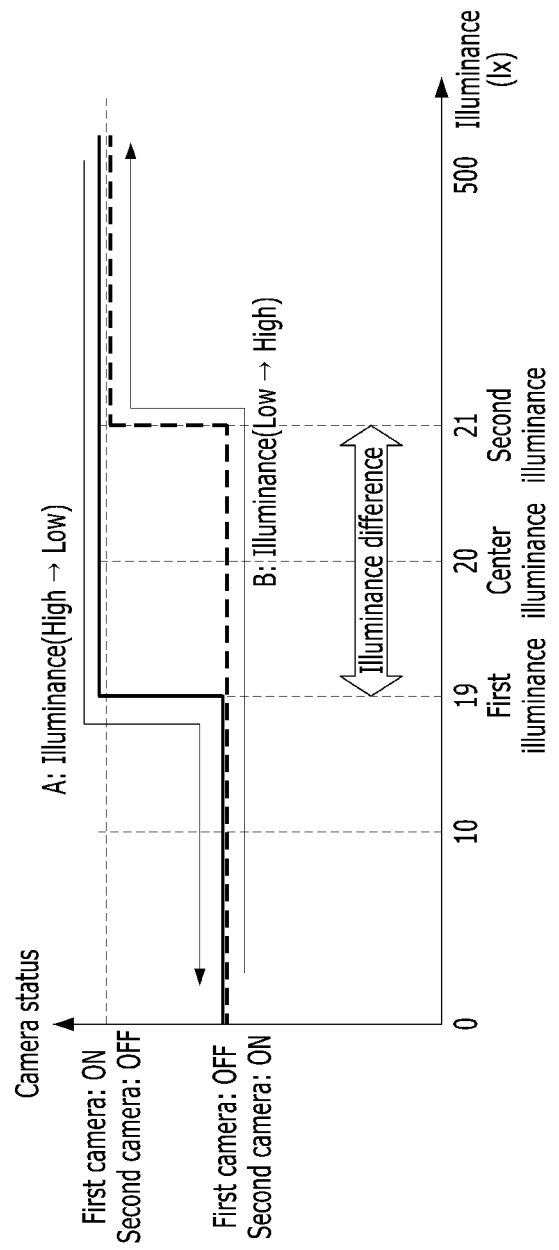
FIG. 13 is a graph illustrating an operation switch between first and second cameras with respect to a change of illuminance according to one embodiment of the present disclosure.

To solve this problem, the video camera 200 according to the present disclosure may include a first camera 235a (e.g., RGB camera) for visible light photography and a second camera 235b (e.g., Infrared (IR) camera) for infrared photography, and may photograph the subject with one of the first camera 235a and 235b according to the brightness of ambient light sensed by the illuminance sensor 242. This will be described with further reference to FIG. 12 and FIG. 13. FIG. 12 is a flowchart of an operation switch between the first camera and the second camera of the video camera according to one embodiment of the present disclosure. FIG. 13 is a graph illustrating an operation switch between the first and second cameras with respect to a change of illuminance according to one embodiment of the present disclosure.

It is assumed that the video camera 200 is photographing a subject through the first camera 235a [S10]. An image of the subject photographed by the first camera 235a may be a visible light still or moving image. In this case, the first camera 235a may be turned on to photograph the subject, while the second camera 235b may be turned off. Alternatively, while both of the first camera 235a and the second camera 235b are turned on, the first camera 235a may be in an active mode to photograph the subject and the second camera 235b may be in a sleep mode.

While the video camera 200 photographs the subject through the first camera 235a, the controller 280 may monitor an ambient light illuminance (or a subject illuminance) sensed by the illuminance sensor 242 and determine whether the illuminance becomes less than or equal to a first illuminance [S20]. Here, the sensed ambient light illuminance may include a visible light illuminance.

As a result of the determination in the step S20, if the sensed illuminance is not less than or equal to the first illuminance, the controller 280 may control the step S10 to be maintained continuously.

On the contrary, as a result of the determination in the step S20, if the sensed illuminance is less than or equal to the first illuminance, the controller 280 may perform an operation switch between the first camera 235a and the second camera 235b to control the subject to be photographed by the second camera 235b instead of the first camera 235a [S30]. An image of the subject photographed by the second camera 235b may include an infrared still or moving image. The fact that the sensed illuminance becomes less than or equal to the first illuminance may mean an illuminance change indicated by "A" in the graph of FIG. 13. Although FIG. 13 illustrates that the first illuminance is 19 lux, the first illuminance is not limited thereto.

In the step S30, the operation switch may be performed in a manner of turning off the first camera 235a and turning on the second camera 235b. Alternatively, while both of the first camera 235a and the second camera 235b are turned on, the operation switch may be performed in a manner of switching the first camera 235a from the active mode to the sleep mode and switching the second camera 235a from the sleep mode to the active mode to photograph the subject.

The controller 280 may turn on the infrared light source 254 when photographing the subject with the second camera 235b. However, the infrared light source does not necessarily have to be turned on while the subject is photographed through the second camera 235b. In this case, the video camera 200 may not include the infrared light source. The operation of the infrared light source will be described later.

Meanwhile, while the video camera 200 photographs a subject through the second camera 235b, the controller 280 may monitor an ambient light illuminance (or a subject illuminance) sensed by the illuminance sensor 242 and determine whether the illuminance becomes equal to or greater than a second illuminance [S40]. Here, the sensed ambient light illuminance may include a visible light illuminance. The second illuminance may be a value greater than the first illuminance.

As a result of the determination in the step S40, when the sensed illuminance is not greater than or equal to the second illuminance, the controller 280 may control to the step S30 to be continuously maintained.

On the contrary, as a result of the determination in the step S40, if the sensed illuminance becomes greater than or equal to the second illuminance, the controller 280 may control to return to the step S10. That is, the controller 280 may perform an operation switch between the first camera 235a and the second camera 235b, thereby controlling the first camera 235a to photograph the subject instead of the second camera 235b. In this case, the first camera 235a may be turned on to photograph the subject, and the second camera 235b may be turned off. Alternatively, the first camera 235a may be in the active mode to photograph the subject while both the first camera 235a and the second camera 235b are turned on, and the second camera 235b may be in the sleep mode, which is the same as described above. The fact that the sensed illuminance is equal to or greater than the second illuminance may mean an illuminance change indicated by "B" in the graph of FIG. 13. Although FIG. 13 illustrates that the second illuminance is 21 lux, the second illuminance is not limited thereto.

The first illuminance for switching from the first camera 235a to the second camera 235b and the second illuminance for switching from the second camera 235b to the first camera 235a are different from each other. In FIG. 13, the difference in illumination is illustrated to be 2 lux, but is not limited thereto. If the first and second illuminances are the same, when the indoor or outdoor ambient light brightness of the subject is frequently fluctuating near the same illuminance, the operation switch between the first camera 235a and the second camera 235b is performed because of being too sensitive to the fluctuation. This is to prevent such an operation switch.

However, if the illuminance difference between the first and second illuminances becomes a large predetermined value, the operation switch between the first camera 235a and the second camera 235b may not be appropriately performed because the indoor or outdoor brightness of the subject is too insensitive to fluctuations, which may interfere with the video camera 200 in taking an appropriate image of the subject. But even so, if the illuminance difference between the first and second illuminances becomes a small predetermined value, a problem similar to the former problem caused when the first and second illuminances are the same may still occur.

Figure 14:
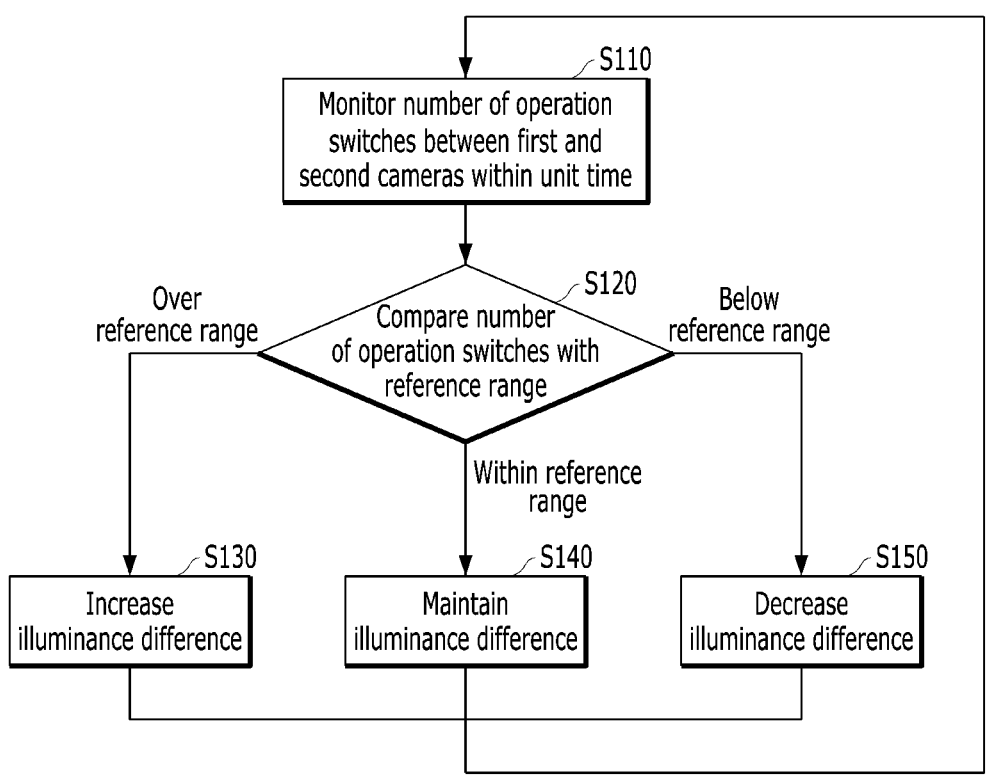
FIG. 14 is a flowchart for a method of automatically adjusting an illuminance difference between a first illuminance and a second illuminance shown in FIG. 13.

Hereinafter, with reference to FIG. 14, a method of automatically adjusting an illuminance difference between the first and second illuminances in a manner that the video camera monitors a fluctuation in ambient light brightness will be described. FIG. 14 is a flowchart for a method of automatically adjusting the illuminance difference between the first illuminance and the second illuminance shown in FIG. 13.

The controller 280 may monitor the number of operation switches between the first camera 235a and the second camera 235b per unit time (e.g., 1 hour) [S110].

The controller 280 may compare the number of the operation switches per unit time with a prescribed reference range (e.g., 5 to 10 times) [S120].

As a result of the determination of the step S120, when the number of the operation switches per unit time exceeds the prescribed reference range, the controller 280 may increase the illuminance difference [S130] The illuminance difference may be increased to a predetermined value or may be variably increased in proportion to the number of the operation switches.

In this case, a central illuminance of the illuminance difference may be maintained as it is. Accordingly, the illuminance difference may increase in a manner of decreasing the first illuminance while increasing the second illuminance. For example, in FIG. 13, the illuminance difference may increase from 2 lux to 4 lux in such a way that the first illuminance decreases from 19 lux to 18 lux and the second illuminance increases from 21 lux to 22 lux.

However, it is not limited to this. The central illuminance of the illuminance difference may be changed. For example, the illuminance difference may increase in a way that the first illuminance is maintained and the second illuminance is increased, or the illuminance difference may increase in a way that the first illuminance is decreased and the second illuminance is maintained.

As a result of the determination of the step S120, when the number of the operation switches per unit time is within the prescribed reference range, the controller 280 may maintain the illuminance difference [S140].

As a result of the determination of the step S120, when the number of the operation switches per unit time is less than the prescribed reference range, the controller 280 may decrease the illuminance difference [S150] The illuminance difference may be decreased to a predetermined value or may be variably decreased in proportion to the number of the operation switches.

In this case, the central illuminance of the illuminance difference may be maintained as it is. Accordingly, the illuminance difference may be decreased in a manner of increasing the first illuminance while decreasing the second illuminance. For example, in FIG. 13, the difference in illuminance may be decreased from 2 lux to 1 lux in a manner of increasing the first illuminance from 19 lux to 19.5 lux and decreasing the second illuminance from 21 lux to 20.5 lux.

However, it is not limited to this. The central illuminance of the illuminance difference may be changed. For example, the illuminance difference may be decreased in a way that the first illuminance is maintained and the second illuminance is decreased, or the illuminance difference may be decreased in a way that the second illuminance is maintained and the first illuminance is increased.

On the other hand, it may be a desirable environment when the number of the operation switches per unit time is small. Hence, as a result of the determination of the step S120, if the number of the operation switches per unit time is less than the prescribed reference range, there may be no problem when the controller 280 maintains the illuminance difference.

According to the above description, the number of operation switches between the first camera and the second camera is controlled by adjusting the illuminance difference between the first illuminance and the second illuminance. In addition to the adjustment of the illuminance difference, the number of operation switches between the first and second cameras can be controlled by adjusting a transition time of an operation switch between the first and second cameras.

Figure 15:
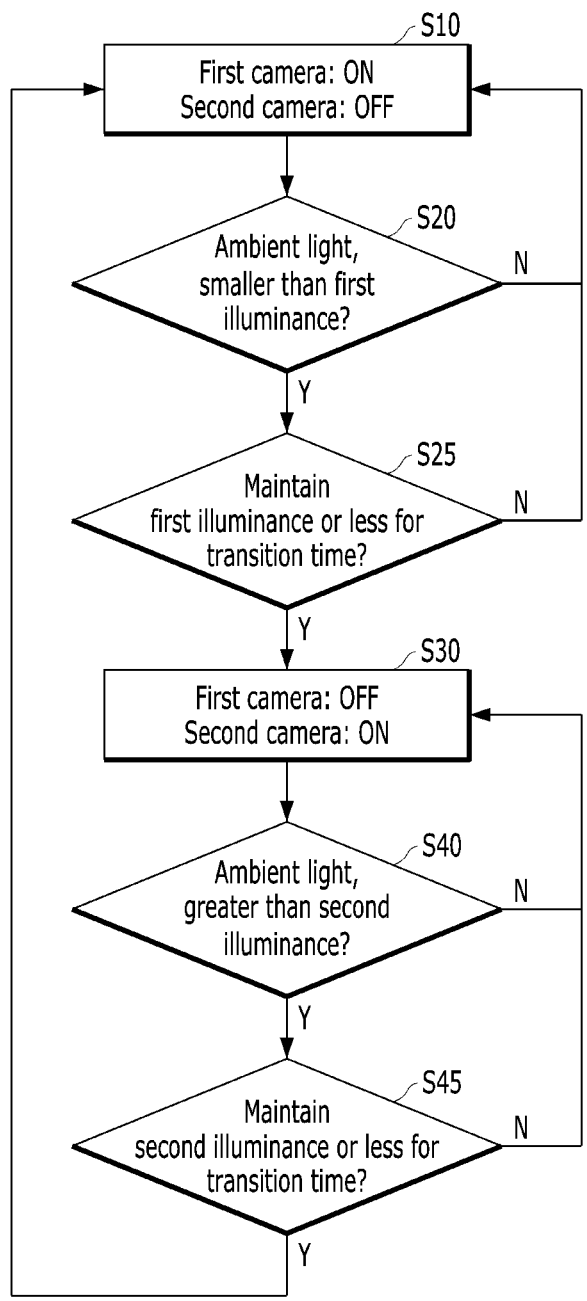
FIG. 15 is a flowchart for an operation switch between first and second cameras of a video camera according to one embodiment of the present disclosure.

First, with reference to FIG. 15, an operation switch between a first camera and a second camera will be described in consideration of an operation switch transition time between the first camera and the second camera. FIG. 15 is a flowchart for an operation switch between first and second cameras of a video camera according to one embodiment of the present disclosure.

The video camera 200 may photograph a subject through the first camera 235a [S10]. In this case, the first camera 235a may be turned on to photograph the subject, and the second camera 235b may be turned off. Alternatively, as described above, while both the first camera 235a and the second camera 235b are turned on, the first camera 235a may be in an active mode to photograph the subject and the second camera 235b may be in a sleep mode.

While the video camera 200 photographs the subject through the first camera 235a, the controller 280 may monitor an ambient light illuminance (or a subject illuminance) sensed by the illuminance sensor 242 and determine whether the illuminance becomes less than or equal to a first illuminance [S20].

As a result of the determination in the step S20, when the sensed illuminance is not less than or equal to the first illuminance, the controller 280 may control the step S10 to be continuously maintained.

However, as a result of the determination in the step S20, if the sensed illuminance becomes less than or equal to the first illuminance, the controller 280 may determine whether the illuminance sensed by the illuminance sensor 242 is maintained less than or equal to the first illuminance during a preset transition time [S25]. A starting point of the transition time in the step S25 is a time point at which the sensed illuminance becomes less than or equal to the first illuminance.

As a result of the determination in the step S25, if the sensed illuminance is not maintained less than or equal to the first illuminance during the transition time (for example, when the illuminance is increased to the first illuminance or higher during the transition time), the controller 280 may control the step S10 to be continuously maintained.

However, as a result of the determination in the step S25, if the sensed illuminance is maintained below the first illuminance for the transition time, the controller 280 may perform an operation switch between the first camera 235a and the second camera 235b to control the second camera 235b to photograph the subject instead of the first camera 235a [S30]. Since this has been described above in the step S30, a detailed description will be omitted for simplicity of the present disclosure.

Meanwhile, while the video camera 200 photographs the subject through the second camera 235b, the controller 280 may monitor the ambient light illuminance (or the subject illuminance) sensed by the illuminance sensor 242 and determine whether the illuminance becomes equal to or greater than a second illuminance.

As a result of the determination in the step S40, when the sensed illuminance is not greater than or equal to the second illuminance, the controller 280 may control to the step S30 to be continuously maintained.

However, as a result of the determination in the step S40, if the sensed illuminance is greater than or equal to the second illuminance, the controller 280 may determine whether the illuminance sensed by the illuminance sensor 242 is maintained greater than or equal to the second illuminance during the transition time [S45]. A starting point of the transition time in the step S45 is a time point at which the sensed illuminance becomes equal to or greater than the second illuminance.

As a result of the determination in the step S45, if the sensed illuminance is not maintained above the second illuminance during the transition time (for example, when the illuminance is lowered below the second illuminance during the transition time), the controller 280 may control the step S30 to be continuously maintained.

However, as a result of the determination in the step S45, if the sensed illuminance is maintained equal to or greater than the second illuminance for the transition time, the controller 280 may perform an operation switch between the first camera 235a and the second camera 235b to control the subject to be photographed by the first camera 235a [S10]. As the step S10 is described above, a detailed description will be omitted for the simplicity of the present disclosure.

By adjusting the transition time, the number of operation switches between the first camera and the second camera may be controlled. That is, when the transition time increases, the number of operation switches between the first camera and the second camera decreases. When the transition time decreases, the number of operation switches between the first camera and the second camera may increase.

Figure 16:
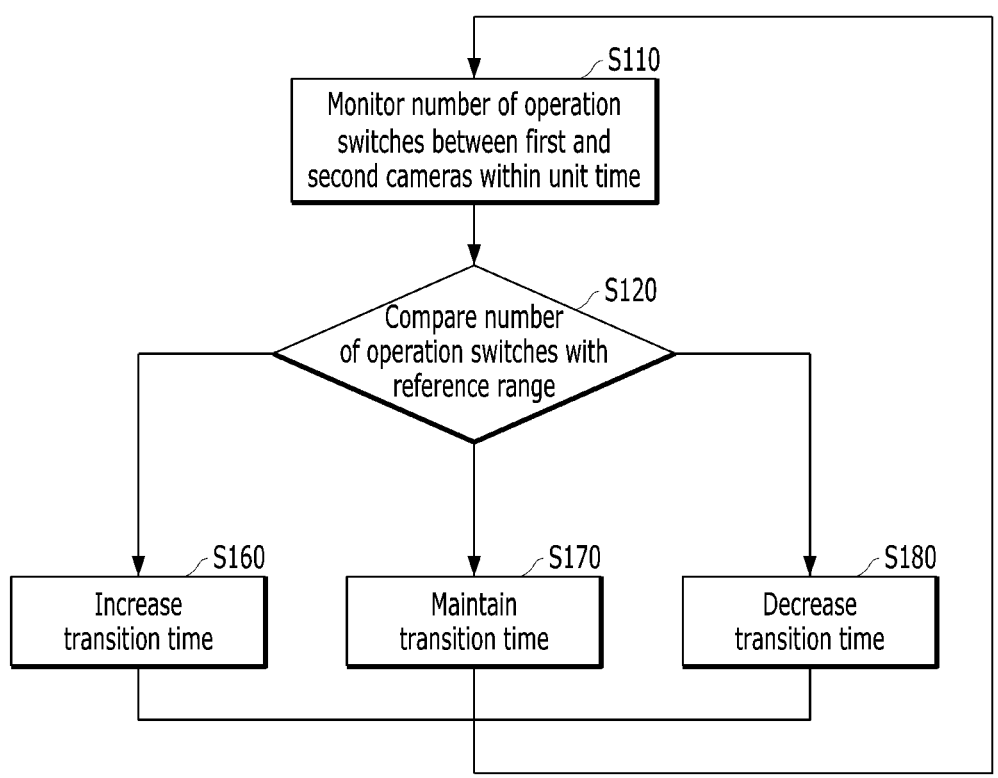
FIG. 16 is a flowchart for a method of automatically adjusting an operation switch transition time of FIG. 15.

Hereinafter, a method of automatically adjusting the transition time by the video camera in a manner of monitoring an ambient light brightness fluctuation situation will be described with reference to FIG. 16. FIG. 16 is a flowchart for a method of automatically adjusting an operation switch transition time of FIG. 15.

The controller 280 may monitor the number of operation switches between the first camera 235a and the second camera 235b per unit time (e.g., 1 hour) [S110].

The controller 280 may compare the number of operation switches per unit time with a prescribed reference range (e.g., 5 to 10 times) [S120].

As a result of the determination of the step S120, when the number of operation switches per unit time exceeds the prescribed reference range, the controller 280 may increase the transition time [S160]. The transition time may be increased to a predetermined value or may be variably increased in proportion to the number of operation switches.

As a result of the determination of the step S120, when the number of operation switches per unit time is within the prescribed reference range, the controller 280 may maintain the transition time [S170].

As a result of the determination of the step S120, when the number of operation switches per unit time is less than the prescribed reference range, the controller 280 may decrease the transition time [S180]. The transition time may be decreased to a predetermined value or may be variably decreased in proportion to the number of operation switches.

On the other hand, it may be a desirable environment when the number of the operation switches per unit time is small. Hence, as a result of the determination of the step S120, if the number of the operation switches per unit time is less than the prescribed reference range, there may be no problem when the controller 280 maintains the transition time.

Figure 17:
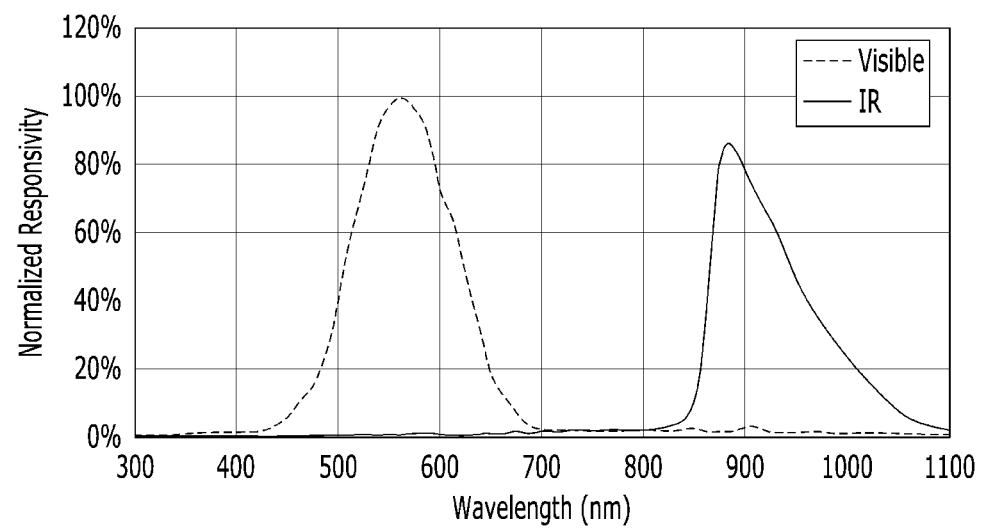
FIG. 17 is an operation graph of an illuminance sensor available for according to one embodiment of the present disclosure.

Hereinafter, an operation of the illuminance sensor 242 and a corresponding operation of the infrared light source 254 will be described with reference to FIG. 17. FIG. 17 is an operation graph of an illuminance sensor available for according to one embodiment of the present disclosure.

As shown in FIG. 17, the illuminance sensor 242 may be configured to sense visible light as well as infrared light. The illumination sensor 242 may operate in one of a first mode for sensing the visible light, a second mode for sensing the infrared light, and a third mode for sensing both the visible light and the infrared light. The mode setting may be performed by a user command through the user input unit 238.

When the illuminance sensor 242 operates in the mode for sensing the infrared light, the controller 280 may determine whether to turn on the infrared light source 254 according to the illuminance of the sensed infrared light while photographing a subject with the second camera 235b.

That is, the controller 280 may turn on the infrared light source 254 if the illuminance of the sensed infrared light is less than or equal to a preset reference value while the subject is being photographed with the second camera 235b. In addition, the brightness of the infrared light source 254 may be adjusted to be inversely proportional to the illuminance of the sensed infrared light.

Namely, the controller 280 may prevent a lack of a light amount on the subject or a light amount saturation on the subject by adjusting the brightness of the infrared light source 254 while shooting the subject with the second camera 235b.

Meanwhile, in order to determine turn-on/turn-off of the infrared light source 254, it is not necessary for the illuminance sensor 242 to be capable of sensing the infrared light. For example, the controller 280 may control the infrared light source 254 to be turned on at a predetermined brightness while the subject is photographed with the second camera 235b and control the infrared light source 254 to be turned off while the subject is photographed with the first camera 235a.

Figure 18:
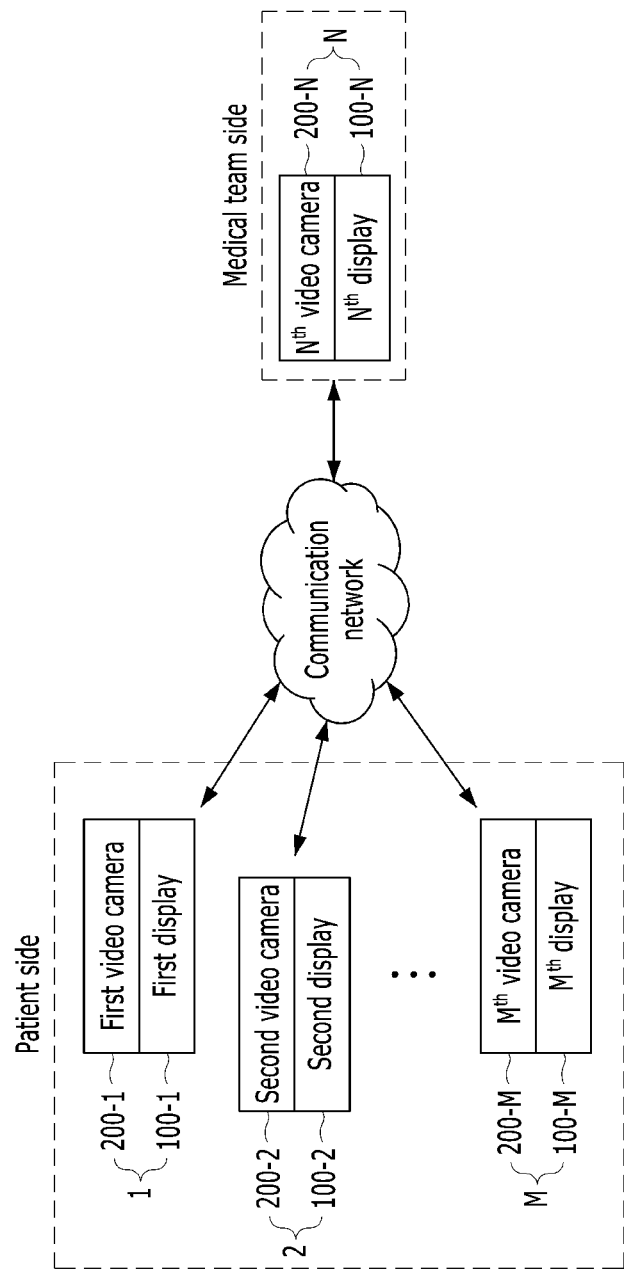
FIG. 18 is a diagram showing a monitoring system to which a video camera according to one embodiment of the present disclosure is applicable.

Hereinafter, with reference to FIG. 18, a service providable through the above-configured video camera 200 will be described. FIG. 18 is a diagram showing a monitoring system to which a video camera according to one embodiment of the present disclosure is applicable.

The video camera 200 may be used for a monitoring system as shown in FIG. 18. Although FIG. 18 illustrates that the monitoring system is applied to a medical facility, it may be used for other purposes.

The monitoring system may include a plurality of video cameras 200-1, 200-2 ... 200-M, and 200-N. A plurality of the video cameras 200-1, 200-2 ... 200-M, and 200-N may be connected to individual displays 100-1, 100-2 ... 100-M, and 100-N, respectively. An individual video camera and a corresponding individual display may configure a video camera set 1, 2 ... M or N. Each of the video camera sets 1, 2 ... M, and N may be provided for an individual patient or medical staff.

In FIG. 18, the first video camera set 1 to the $M^{th}$ video camera set M are provided to the patient side, and the $N^{th}$ video camera set N is provided to the medical team side. Each of the video camera sets 1, 2 ... M and N is connected to a communication network, thereby sharing images photographed through the video cameras 200-1, 200-2 ... 200-M, and 200-N of the video camera sets 1, 2 ... M, and N. That is, images taken through the video cameras 200-1, 200-2 ... 200-M of the video camera sets 1, 2 ... M of the patient side are shared as the video camera set N of the medical team side and then displayed on the display 100-N. An image taken through the video camera 200-N of the video camera set N of the medical team side may be shared with at least one part of the video camera sets 1, 2 ... M of the patient side and displayed on the corresponding displays 100-1, 100-2 ... 100-M.

The video camera sets 1, 2 ... M, and N may be connected to the communication network through the displays 100-1, 100-2 ... 100-M, and 100-N of the corresponding sets, respectively. In this case, images taken through the video cameras 200-1, 200-2 ... 200-M, and 200-N of the video camera sets 1, 2 ... M, and N may be transmitted externally through the corresponding displays 100-1, 100-2 ... 100-M, and 100-N, respectively.

Alternatively, the video camera sets 1, 2 ... M, and N may be connected to the communication network through the video cameras 200-1, 200-2 ... 200-M, and 200-N of the corresponding sets, respectively. In this case, the images taken through the video cameras 200-1, 200-2 ... 200-M, and 200-N of the video camera sets 1, 2 ... M, and N may be externally transmitted in direct, respectively.

In FIG. 18, it is illustrated that the individual displays are included in all video camera sets, respectively. However, a video camera set does not necessarily have to include an individual display. The video camera set may be configured with a video camera only without a display when used for a place failing to require a display usage despite requiring a video camera usage.

Figure 19:
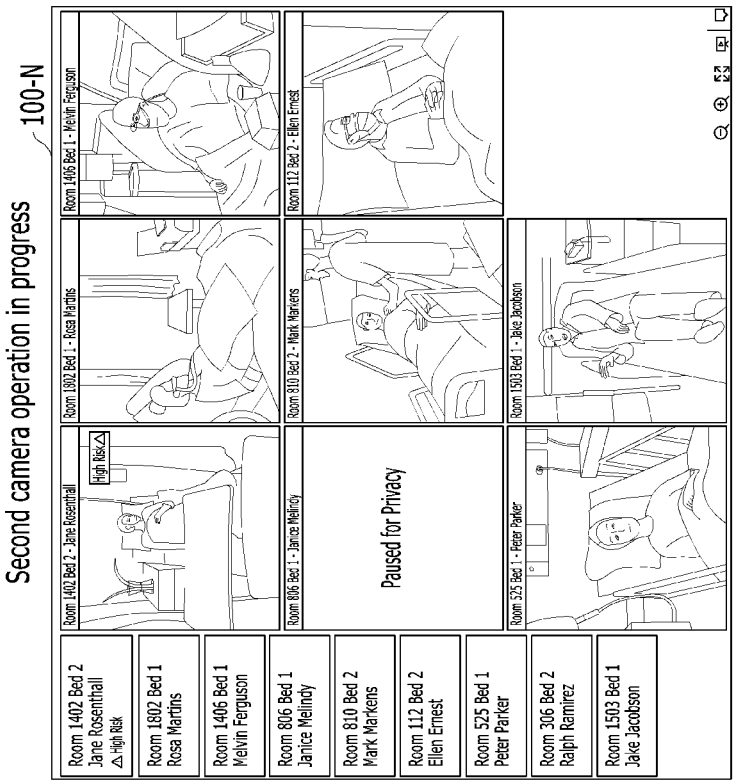
FIGS. 19 to 21 are diagrams illustrating images sharable in the monitoring system of FIG. 18.
Figure 19:
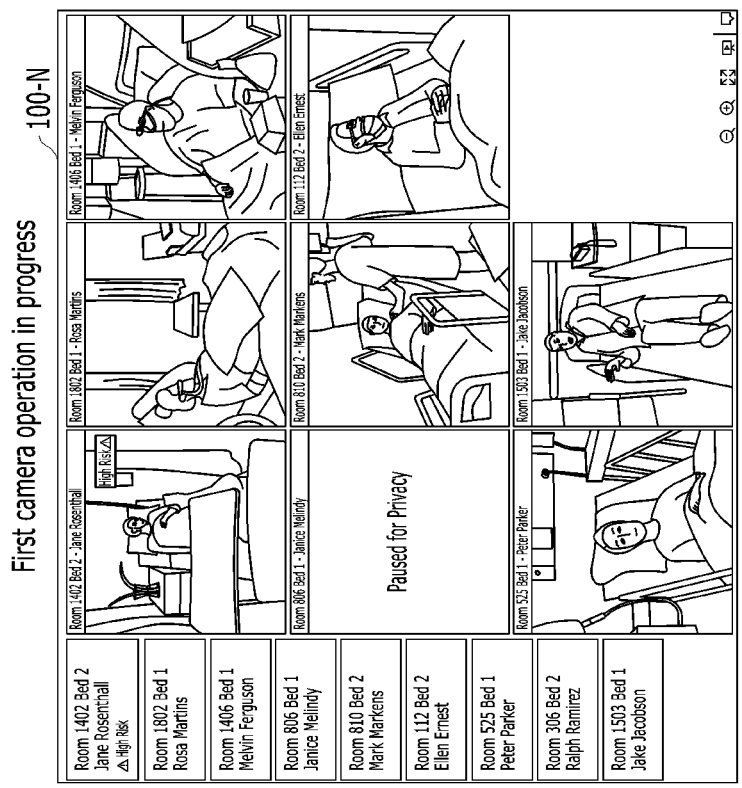

Hereinafter, an image shared in the monitoring system will be described with reference to FIG. 19. FIG. 19 illustrates images sharable in the monitoring system of FIG. 18.

FIG. 19 shows that images taken through a plurality of the video camera sets 1, 2 ... M provided to the patient side are displayed on the corresponding display 100-N by being shared with the video camera set N of the medical team side.

FIG. 19 (19-1) shows a case that a plurality of the video camera sets 1, 2 ... M provided to the patient side are photographed with the first camera 235a of the video camera 200, and FIG. 19 (19-2) shows a case that a plurality of the video camera sets 1, 2 ... M, provided to the patient side are photographed with the second camera 235b of the video camera 200. In other words, FIG. 19 (19-1) illustrates that visible light still or moving images of patients are displayed on the display 100-N of the medical team side, and FIG. 19 (19-2) shows that infrared light still or moving images of patients are displayed on the display 100-N of the medical team side.

Figure 20:
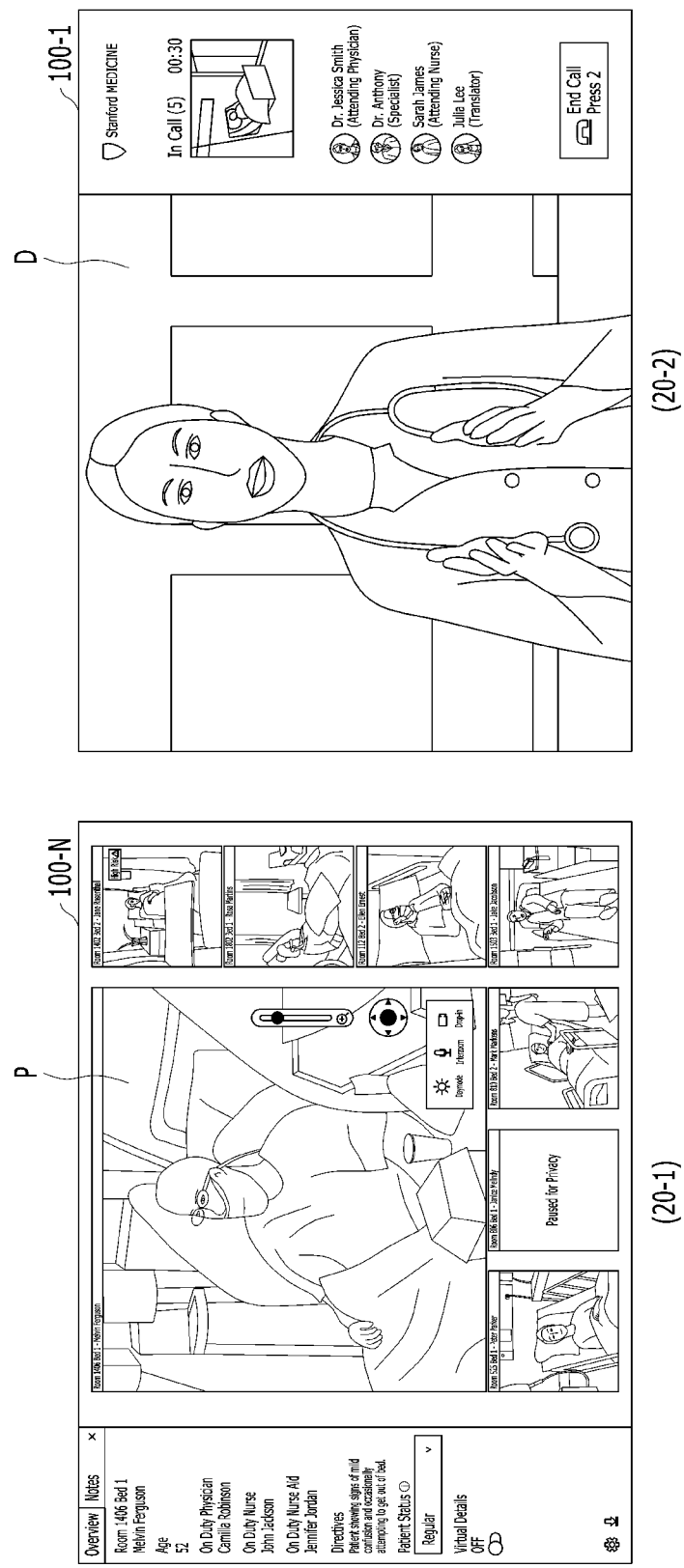

The monitoring system of FIG. 18 may also be used for telemedicine. This will be described further with reference to FIG. 20. FIG. 20 illustrates images sharable in the monitoring system of FIG. 18.

As shown in FIG. 20 (20-1), a plurality of images photographed by a plurality of the video camera sets 1, 2 ... M of the patient side may be displayed on the display 100-N of the video camera set N on the medical team. When a medical team performs remote treatment with one patient, an image P taken by the patient video camera set 1 in charge of the patient under the remote treatment may be enlarged and displayed on the display 100-N of the medical team side. Of course, on the display 100-N of the medical team side, images captured by other patients' video camera sets are not displayed but the image P captured by the patient video camera set 1 may be displayed as a full screen.

Also, as illustrated in FIG. 20 (20-2), an image D captured by the video camera set N of the medical team may be displayed on the display 100-1 of the patient video camera set 1.

That is, as shown in FIG. 20, according to the monitoring system, image communication may be performed between the patient and the medical team. When the video camera 200 is provided with a microphone 218, the voice input through the microphone is shared together with the image, so that a voice call between the medical team and the patient under the remote treatment is possible during the video image communication.

Figure 21:
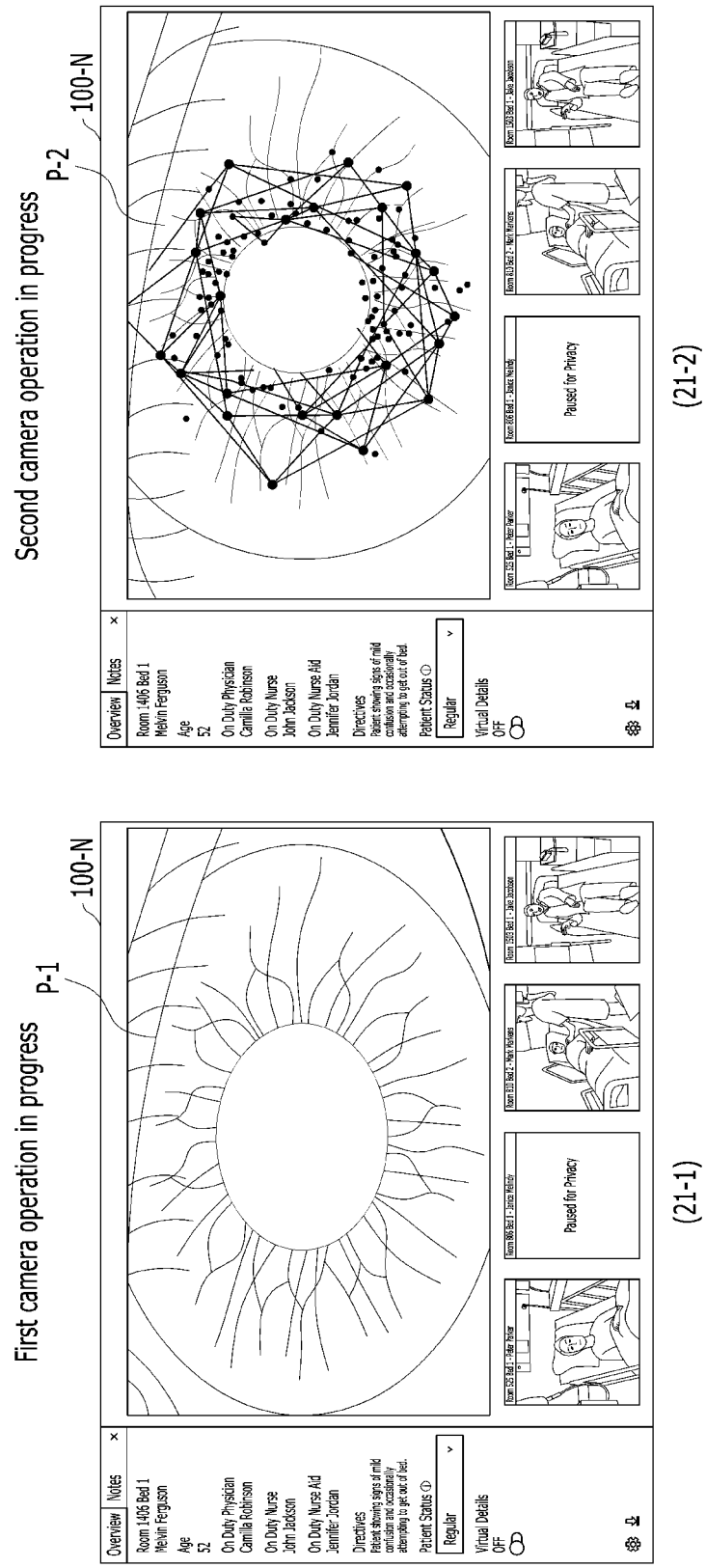

In the above, it has been described that the operation switch between the first camera 235a and the second camera 235b of the video camera 200 is automatically performed by the illuminance sensed by the illuminance sensor 242. However, the present disclosure is not limited thereto. The operation switch between the first camera 235a and the second camera 235b may be manually performed through user manipulation of the user input unit 238 of the video camera 200. An example of using the manual operation switch between the first camera 235a and the second camera 235b will be described with further reference to FIG. 21. FIG. 21 illustrates images sharable in the monitoring system of FIG. 18.

As illustrated in FIG. 21 (21-1), an image P-1 captured by the first camera 235a of the video camera 200-1 of the patient video camera set 1 may be shared with the video camera set N of the medical team during the remote treatment described in FIG. 20. Accordingly, the image P-1 photographed by the first camera 235a of the patient's video camera 200-1 may be displayed on the display 100-N of the video camera set N of the medical team. The photographed image P-1 may be a visible light image obtained by photographing the eye of the patient.

In this case, the operation switch between the first camera 235a and the second camera 235b may be manually performed through user manipulation of the user input unit 238 of the video camera 200-1.

In this case, as illustrated in FIG. 21 (21-2), an image (P-2) captured by the second camera 235b of the video camera 200-1 of the patient video camera set 1 may be shared in the video camera set N of the medical team. Accordingly, the image P-2 photographed by the second camera 235b of the patient's video camera 200-1 may be displayed on the display 100-N of the video camera set N of the medical team. The photographed image P-2 may be an infrared light image obtained by photographing the eye of the patient.

Accordingly, the patient may share both the visible light image and the infrared light image with the medical team, thereby receiving more accurate treatment.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A video camera, comprising:
   a first camera;
   a second camera;
   an illuminance sensor configured to sense an ambient light illuminance or a subject illuminance;
   an interface unit configured to connect to an external device; and
   a controller configured to:
   capture a first camera image through the first camera, capture a second camera image through the second camera by performing a first camera operation switch in response to an illuminance sensed through the illuminance sensor being equal to or smaller than a first illuminance,
   capture the first camera image through the first camera by performing a second camera operation switch in response to the illuminance sensed through the illuminance sensor being equal to or greater than a second illuminance higher than the first illuminance,
   control an illuminance difference between the first illuminance and the second illuminance to be adjusted in consideration of a number of unit-time camera operation switches, and
   control one of the captured first or second images to be transmitted to the external device through the interface unit.

2. The video camera of claim 1,
   wherein based on performing the first camera operation switch, the controller controls the first camera to be turned off and controls the second camera to be turned on, and
   wherein based on performing the second camera operation switch, the controller controls the first camera to be turned on and controls the second camera to be turned off.

3. The video camera of claim 1, wherein based on performing the first camera operation switch, the controller controls the first camera and the second camera to enter a sleep mode and an active mode, respectively and wherein based on performing the second camera operation switch, the controller controls the first camera and the second camera to enter the active mode and the sleep mode, respectively.

4. The video camera of claim 1, wherein the first camera comprises a visible light capturing camera and wherein the second camera comprises an infrared light capturing camera.

5. The video camera of claim 1, wherein, in response to the number of the unit-time camera operation switches exceeding a reference range, the controller controls at least one of the first illuminance or the second illuminance to be adjusted to increase the illuminance difference.

6. The video camera of claim 5, wherein the controller controls the illuminance difference to be increased by increasing the second illuminance while decreasing the first illuminance to maintain a central illuminance of the illuminance difference.

7. The video camera of claim 5, wherein, in response to the number of the unit-time camera operation switches being within the reference range, the controller controls the illuminance difference to be maintained.

8. The video camera of claim 5, wherein, in response to the number of the unit-time camera operation switches being smaller than the reference range, the controller controls at least one of the first illuminance and the second illuminance to be adjusted to decrease the illuminance difference.

9. The video camera of claim 1,
   wherein, in response to the sensed illuminance being maintained equal to or smaller than the first illuminance during a transition time from a timing point of becoming equal to or smaller than the first illuminance, the controller controls the first camera operation switch to be performed, and
   wherein, in response to the sensed illuminance being maintained equal to or greater than the second illuminance during the transition time from a timing point of becoming equal to or greater than the second illuminance, the controller controls the second camera operation switch to be performed.

10. The video camera of claim 9, wherein the controller controls the transition time to be adjusted in consideration of the number of the unit-time camera operation switches.

11. The video camera of claim 10, wherein, in response to the number of the unit-time camera operation switches exceeding the reference range, the controller controls the transition time to be increased.

12. The video camera of claim 10, wherein, in response to the number of the unit-time camera operation switches being within the reference range, the controller controls the transition time to be maintained.

13. The video camera of claim 10, wherein, in response to the number of the unit-time camera operation switches being smaller than the reference range, the controller controls the transition time to be decreased.

14. The video camera of claim 1, further comprising an infrared light source.

15. The video camera of claim 14, wherein the controller controls the infrared light source to be turned on while performing photography through the second camera.

16. The video camera of claim 15, wherein the controller controls a brightness of the infrared light source to be adjusted based on an infrared light illuminance sensed by the illuminance sensor.

17. The video camera of claim 1, further comprising:
    a user input unit configured to receive an input of a user command,
    wherein the controller controls one of the first camera operation switch and the second camera operation switch to be performed in response to the user command through the user input unit.

18. The video camera of claim 1, further comprising:
    a microphone configured to receive an input of audio,
    wherein the controller controls the audio to be transmitted together when one of the captured first and second images is transmitted to the external device through the interface unit.

19. A method of controlling a video camera, the method comprising:
    sensing an ambient light illuminance or a subject illuminance through an illuminance sensor;
    capturing a first camera image through a first camera;
    capturing a second camera image through a second camera by performing a first camera operation switch in response to an illuminance sensed through the illuminance sensor being equal to or smaller than a first illuminance;

capturing the first camera image through the first camera by performing a second camera operation switch in response to the illuminance sensed through the illuminance sensor being equal to or greater than a second illuminance higher than the first illuminance;

control an illuminance difference between the first illuminance and the second illuminance to be adjusted in consideration of a number of unit-time camera operation switches; and transmitting one of the captured first or second images to an external device through an interface unit.

* * * * *